(12) United States Patent
Hodorek et al.

(10) Patent No.: US 12,458,373 B2
(45) Date of Patent: Nov. 4, 2025

(54) BONE REAMER AND METHODS OF USE

(71) Applicant: DePuy Ireland Unlimited Company, Ringaskiddy (IE)

(72) Inventors: Brian C. Hodorek, Winona Lake, IN (US); Russ M. Parrott, Winona Lake, IN (US); Matthew J. Purdy, Winona Lake, IN (US); J. Michael Wiater, Beverly Hills, MI (US); Anand M. Murthi, Baltimore, MD (US); Matthew J. Smith, Columbia, MO (US); Derek J. Cuff, Venice, FL (US); Andrew Jawa, Cambridge, MA (US); Luke Austin, Haddonfield, NJ (US)

(73) Assignee: DePuy Ireland Unlimited Company, Ringaskiddy (IE)

(*) Notice: Subject to any disclaimer, the term of this patent is extended or adjusted under 35 U.S.C. 154(b) by 832 days.

(21) Appl. No.: 17/201,735

(22) Filed: Mar. 15, 2021

(65) Prior Publication Data

US 2021/0196288 A1  Jul. 1, 2021

Related U.S. Application Data

(63) Continuation of application No. PCT/US2019/051322, filed on Sep. 16, 2019.
(Continued)

(51) Int. Cl.
*A61B 17/16* (2006.01)
*A61B 17/84* (2006.01)

(52) U.S. Cl.
CPC ...... *A61B 17/1684* (2013.01); *A61B 17/1633* (2013.01); *A61B 17/1659* (2013.01); *A61B 17/846* (2013.01)

(58) Field of Classification Search
CPC .......... A61B 17/1684; A61B 17/1682; A61B 17/1686; A61B 17/1677; A61B 17/16;
(Continued)

(56) References Cited

U.S. PATENT DOCUMENTS

| 5,100,267 A | 3/1992 | Salyer |
| 6,221,076 B1 | 4/2001 | Albrektsson et al. |

(Continued)

FOREIGN PATENT DOCUMENTS

| CN | 1585623 A | 2/2005 |
| CN | 101105116 A | 1/2008 |

(Continued)

OTHER PUBLICATIONS

Japanese Office Action for JP Application No. 2021-514380 dated Jul. 19, 2022, 10 pages.
(Continued)

*Primary Examiner* — Amy R Sipp
(74) *Attorney, Agent, or Firm* — Barnes & Thornburg LLP

(57) ABSTRACT

A bone reamer includes a shaft having a first and a second end. The second end is configured to connect to a rotating power source. A head of the reamer includes a rear face connected to the first end of the shaft, a cutting face on an opposing side of the head relative to the rear face, and a perimeter portion having an inner perimeter diameter and an outer perimeter diameter. The outer perimeter diameter defines outer boundaries of the rear face and the cutting face. A blade member of the reamer is disposed upon the cutting face and extends at least across the inner perimeter diameter of the perimeter portion. A center drill bit is disposed on the cutting face. The drill bit and cutting blade are concentric about a center axis of the reamer.

15 Claims, 25 Drawing Sheets

Related U.S. Application Data

(60) Provisional application No. 62/731,962, filed on Sep. 16, 2018.

(58) Field of Classification Search
CPC ........... A61B 17/1617; A61B 17/1615; A61B 17/1637; A61B 17/1664–1668; A61B 2017/1602
See application file for complete search history.

(56) References Cited

U.S. PATENT DOCUMENTS

| | | | |
|---|---|---|---|
| 6,322,564 B1* | 11/2001 | Surma | A61F 2/4607 606/89 |
| 6,783,533 B2 | 8/2004 | Green et al. | |
| 7,163,542 B2 | 1/2007 | Ryan | |
| 7,935,117 B2 | 5/2011 | Sackett et al. | |
| 8,696,758 B2 | 4/2014 | Hood et al. | |
| 9,517,076 B2 | 12/2016 | Papenfuss | |
| 9,681,881 B1 | 6/2017 | Billiet et al. | |
| 9,820,758 B2 | 11/2017 | Lappin et al. | |
| 10,772,668 B2 | 9/2020 | Barth et al. | |
| 2005/0145417 A1 | 7/2005 | Radford et al. | |
| 2006/0004371 A1 | 1/2006 | Williams, III et al. | |
| 2008/0195101 A1 | 8/2008 | Lechot et al. | |
| 2008/0195105 A1 | 8/2008 | Sidebotham et al. | |
| 2008/0294168 A1 | 11/2008 | Wieland | |
| 2009/0132045 A1 | 5/2009 | LaFosse | |
| 2009/0163921 A1 | 6/2009 | Lechot et al. | |
| 2010/0069908 A1 | 3/2010 | Sidebotham et al. | |
| 2010/0145342 A1 | 6/2010 | Grace et al. | |
| 2010/0168753 A1* | 7/2010 | Edwards | A61B 17/1675 606/88 |
| 2010/0241124 A1 | 9/2010 | Housman et al. | |
| 2010/0268238 A1* | 10/2010 | Sikora | A61F 2/4081 606/87 |
| 2011/0028977 A1 | 2/2011 | Rauscher et al. | |
| 2011/0144649 A1 | 6/2011 | Victor | |
| 2011/0202060 A1 | 8/2011 | White et al. | |
| 2011/0245831 A1 | 10/2011 | Giersch et al. | |
| 2012/0239043 A1 | 9/2012 | Lappin | |
| 2015/0119891 A1* | 4/2015 | Goldberg | A61B 17/1684 606/80 |
| 2015/0265288 A1* | 9/2015 | Guederian | A61B 17/1684 606/80 |
| 2016/0074047 A1 | 3/2016 | Fritzinger et al. | |
| 2016/0262897 A1 | 9/2016 | Birmingham | |
| 2016/0324648 A1* | 11/2016 | Hodorek | A61F 2/4059 |
| 2017/0049461 A1 | 2/2017 | Papenfuss | |
| 2017/0172464 A1 | 6/2017 | Cloutier | |
| 2017/0181756 A1 | 6/2017 | Slone et al. | |
| 2017/0304063 A1* | 10/2017 | Hatzidakis | A61F 2/4003 |
| 2018/0200068 A1 | 7/2018 | Goldberg et al. | |

FOREIGN PATENT DOCUMENTS

| | | |
|---|---|---|
| CN | 102821707 A | 12/2012 |
| CN | 104271055 A | 1/2015 |
| CN | 104602622 A | 5/2015 |
| CN | 104786426 A | 7/2015 |
| CN | 106913405 A | 7/2017 |
| EP | 1987785 A2 | 11/2008 |
| EP | 3284442 | 2/2018 |
| EP | 3284442 A2 | 2/2018 |
| JP | 0585317 A | 4/1993 |
| JP | H0647057 A | 2/1994 |
| JP | 2007531590 A | 11/2007 |
| JP | 2008541915 A | 11/2008 |
| KR | 20180088242 A | 8/2018 |
| WO | 2012129018 | 9/2012 |
| WO | 2020023971 A1 | 1/2020 |
| WO | 2020023973 A1 | 1/2020 |
| WO | 2020023975 A1 | 1/2020 |

OTHER PUBLICATIONS

Extended European Search Report for Application 19860689.9 dated Jun. 29, 2022, 13 pages.
Partial Supplementary European Search Report dated Mar. 17, 2022, 10 pages.
International Preliminary Report on Patentability for International Application No. PCT/US2018/057554, March 5 bages, International Bureau of WIPO.
International Search Report and Written Opinion of the International Searching Authority for International Application No. PCT/US2019/051322 mailed on Jan. 24, 2020.
English translation of Second Office Action, Chinese Application No. 201980070841.0, May 13, 2024, 14 pages.
International Search Report, International Application No. PCT/US19/51322, Jan. 24, 2020, 4 pages.

* cited by examiner

BONE REAMER AND METHODS OF USE

CROSS-REFERENCE TO RELATED APPLICATIONS

This application claims priority benefit from International Application No. PCT/US2019/051322 filed on Sep. 16, 2019, which claimed priority from U.S. Provisional Application No. 62/731,962 filed Sep. 16, 2018, each of which is incorporated herein by reference in its entirety.

FIELD OF THE INVENTION

The present invention relates generally to orthopedic surgery, bone reamers used for replacing an articulation surface in a joint, such as, for example, shoulder prostheses. More specifically, but not exclusively, the present invention relates to the glenoid reamer for shoulder arthroplasties, as well as methods for using the same.

BACKGROUND OF THE INVENTION

A bone reamer is used to prepare a bone for receiving an orthopedic implant. For example, a surgeon may place the cutting head of a bone reamer against the glenoid cavity of a scapula. The surgeon would rotate the reamer using an external rotatable drive source such that the cutting teeth rotate to remove bone from the glenoid surface. Since the cutting head is of a substantially constant uniform diameter, the surgeon typically removes a relatively small amount of bone and moves the cutting head away from the glenoid surface to inspect the cut surface. If additional bone must be removed, it is necessary for the surgeon to again insert the cutting head through the opening formed in the soft tissue and against the glenoid surface to be cut.

Currently, bone reamers are typically fabricated as modular units that are sold in a set of an array of diameters. These reamer tool sets are manufactured with reamer cutting heads providing bore sizes ranging from about 20 mm to about 60 mm in 0.5 mm increments sometimes totaling over 25 sizes. Since it is desirable to achieve a close prosthetic fit, a wide array of reaming tools of varying sizes are required to be on hand to provide the most precise cut and optimum bore diameter.

Reamers have historically been comprised two components, a one-piece reamer cutting head and a reamer shaft that connects to the reamer head assembly. The one-piece reamer cutting head is machined from a single block of metal into a hollow cylinder incorporated with a series of protruding blades that emerge from the outer surface of the cylinder.

Currently, reamer cutting heads are typically manufactured from a single piece of biocompatible metal. Traditional reamer cutting heads are fabricated using intricate precision machining techniques that create the central cylinder and the series of protruding reamer blades. This manufacturing process is time consuming and is not cost effective.

Because of their high cost, traditional cutter heads are typically reused multiple times. Over time, as these reamer heads are used and reused, the cutting blades become dull. Therefore, the reamer cutting blades are required to be sharpened and/or replaced. However, sharpening or replacing adds additional cost. In addition, reusable devices increase the possibility of infection. There is a high likelihood that the sterilization process may not remove all possible infection agents such as bacteria and the like.

Unfortunately, there is no simple way to evaluate cutting efficiency after these reamer tools have been used and reused. Many times it isn't until the surgeon uses the reamer again that they become aware that the reamer is cutting incorrectly. In many cases an ineffective, dull, or contaminated reamer tool is not detected until well into the reaming procedure or even after the procedure is complete. Good surgical outcomes are largely dependent on the use of a sharp, sterile reamer that is in optimal condition. Poor surgical outcomes such as a damaged or cracked glenoid can occur as a result of using dull or damaged reamers.

Preparing an articulation surface in a bone structure to receive an orthopedic implant often requires at least a two-step, and often a three-step, reaming and drilling process. This is because many orthopedic implants have multiple bone fixation structures for securely engaging the bone structure that the implant is being attached to.

Further, surgeons have varying preferences of the bone reamer head configuration because of limited surgical exposures. In order to meet varying surgeon preferences, the kits for performing bone reaming may have to contain bone reamers with various outer profiles to address exposure issues and bone quality wherein each additional reamer head profile would increase the cost of the kit. Alternatively, multiple kits, wherein each kit has a specific shaped reamer configuration, could be supplied, which would also increase the cost of each kit.

What is needed in the art is a cost-effective single use bone reamer with a novel blade and assembly head design. Also, what is needed in the art is a bone reamer that can prepare the bone in one reaming procedure. Further, what is needed in the art is a bone reamer that has an adjustable outer profile that can meet the varying surgeon preferences.

SUMMARY OF THE INVENTION

Aspects of the present invention provide bone reamers for shoulder arthroplasties. The present invention also provides for methods for using the bone reamers.

In an aspect, provided herein is a bone reamer including a shaft having a first and a second end. The second end is configured to connect to a power source. A head of the reamer includes a rear face connected to the first end of the shaft, a cutting face on an opposing side of the head relative to the rear face, and a perimeter portion having an inner perimeter diameter and an outer perimeter diameter. The outer perimeter diameter defines outer boundaries of the rear face and the cutting face. A blade member of the reamer is disposed upon the cutting face and extends at least across the inner perimeter diameter of the perimeter portion. The blade member includes a first blade portion having a first cutting edge, and a second blade portion having a second cutting edge. The first and second cutting edges are disposed on opposing sides of the blade member. A center drill bit of the reamer is disposed on the cutting face between the first and second cutting edges of the blade member. The center drill bit and the blade member are concentric with a center axis of the reamer.

In another aspect, provided herein is a bone reamer including a shaft having a first and a second end. The second end is configured to connect to a power source. A head of the reamer includes a rear face connected to the first end of the shaft, a cutting face on an opposing side of the head relative to the rear face, and a perimeter portion having an inner perimeter diameter and an outer perimeter diameter. The outer perimeter diameter defines outer boundaries of the rear face and the cutting face. The perimeter portion also includes a first removable member. The first removable member includes a first end having a breakable connection to an adjacent first section of the perimeter portion. The first end is configured to break off of the first section when a predetermined torque is applied to the first removable member. The first removable member also includes a second end that is spaced apart from an adjacent second section of the perimeter portion. The second section of the perimeter portion having solely rounded surfaces disposed between the rear face and the cutting face of the head. A blade member of the reamer is disposed upon the cutting face and extends at least across the inner perimeter diameter of the perimeter portion. The blade member includes a first blade portion having a first cutting edge, and a second blade portion having a second cutting edge. The first and second cutting edges are disposed on opposing sides of the blade member.

In another aspect, provided herein is a disposable surgical kit including a bone reamer configured to simultaneously machine a smoothed circular surface and a center bore hole in a bone. The bone reamer includes a shaft having a first and a second end. The second end is configured to connect to a power source. A head of the bone reamer includes a rear face connected to the first end of the shaft, a cutting face on an opposing side of the head relative to the rear face, and a perimeter portion having an inner perimeter diameter and an outer perimeter diameter. The outer perimeter diameter defines outer boundaries of the rear face and the cutting face. A blade member of the reamer is disposed upon the cutting face and extends at least across the inner perimeter diameter of the perimeter portion. The blade member includes a first blade portion having a first cutting edge, and a second blade portion having a second cutting edge. The first and second cutting edges are disposed on opposing sides of the blade member. A center drill bit of the reamer is disposed on the cutting face between the first and second cutting edges of the blade member. The center drill bit and the blade member are concentric with a center axis of the reamer. A pin of the kit is for proper placement of the bone reamer on the bone. An implant of the kit is for insertion onto the smoothed circular surface and into the center bore hole of the bone.

In another aspect provided herein is a method of surgically implanting an orthopedic implant into a bone. The method includes surgically exposing the surface of the bone. A sizer is selected from a plurality of sizers, each sizer having a different size. A handle is utilized to place the sizer against a portion of the bone to locate the center of the portion of the bone. A pin is inserted into a through-hole of the handle and against the center of the portion of the bone. The pin is driven into the center of the portion of the bone. A bone reamer is slid over the pin to align the bone reamer with the center of the portion of the bone. The portion of the bone is machined with the bone reamer to simultaneously ream a smooth circular surface, drill a center bore hole and drill a circular groove into the portion of the bone. The center bore hole, circular groove and circular surface are concentric. A trial is slid over the pin to test a fit of an implant. An insertion tool is used to insert the implant into the center bore hole and onto the circular surface.

These, and other objects, features and advantages of this invention will become apparent from the following detailed description of the various aspects of the invention taken in conjunction with the accompanying drawings.

BRIEF DESCRIPTION OF THE DRAWINGS

The accompanying drawings, which are incorporated in and constitute a part of the specification, illustrate embodiments of the invention and together with the detailed description herein, serve to explain the principles of the invention. The drawings are only for purposes of illustrating preferred embodiments and are not to be construed as limiting the invention. It is emphasized that, in accordance with the standard practice in the industry, various features are not drawn to scale. In fact, the dimensions of the various features may be arbitrarily increased or reduced for clarity of discussion. The foregoing and other objects, features and advantages of the invention are apparent from the following detailed description taken in conjunction with the accompanying drawings in which.

DETAILED DESCRIPTION FOR CARRYING OUT THE INVENTION

Figure 1:
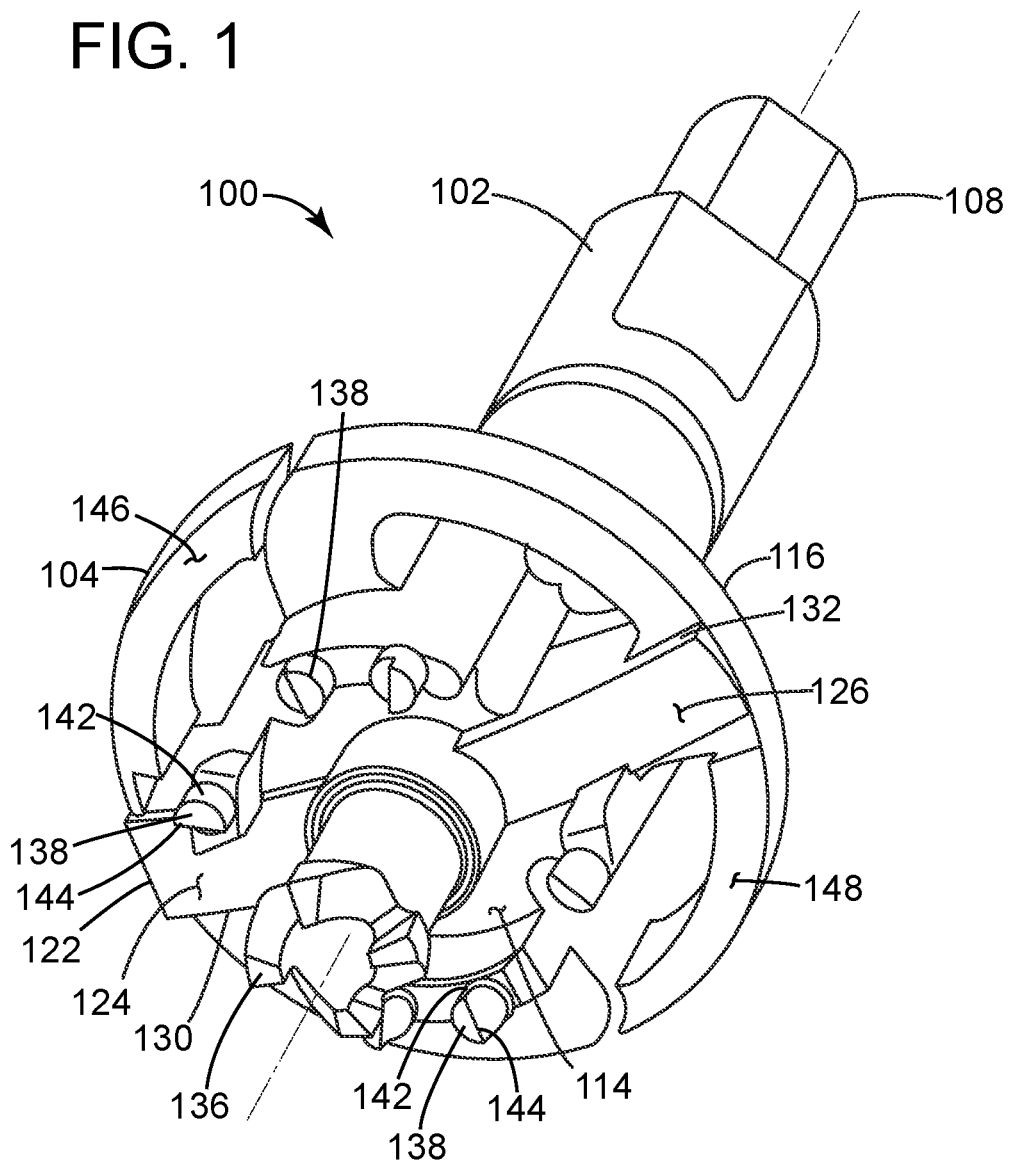
FIG. 1 depicts a bottom perspective view of a bone reamer, in accordance with an aspect of the present invention.

Generally stated, disclosed herein are bone reamers and methods of making the same. Further, surgical methods for using the bone reamers are discussed.

In this detailed description and the following claims, the words proximal, distal, anterior, posterior, medial, lateral, superior and inferior are defined by their standard usage for indicating a particular part of a bone or implant according to the relative disposition of the natural bone or directional terms of reference. For example, "proximal" means the portion of a device or implant nearest the torso, while "distal" indicates the portion of the device or implant farthest from the torso. As for directional terms, "anterior" is a direction towards the front side of the body, "posterior" means a direction towards the back side of the body, "medial" means towards the midline of the body, "lateral" is a direction towards the sides or away from the midline of the body, "superior" means a direction above and "inferior" means a direction below another object or structure.

As used herein, the word "exemplary" or "illustrative" means "serving as an example, instance, or illustration." Any implementation described herein as "exemplary" or "illustrative" is not necessarily to be construed as preferred or advantageous over other implementations. Moreover, in the present description, the terms "upper", "lower", "left", "rear", "right", "front", "vertical", "horizontal", and derivatives thereof shall relate to the invention as oriented in the first figure of each embodiment.

Similarly, positions or directions may be used herein with reference to anatomical structures or surfaces. For example, as the current bone reamers, implants, devices, systems and methods are described herein with reference to use with the bones of the shoulder, the bones of the shoulder and upper arm may be used to describe the surfaces, positions, directions or orientations of the bone reamer, implants, devices, systems and methods. Further, the bone reamers, implants, devices, systems and methods, and the aspects, components, features and the like thereof, disclosed herein are described with respect to one side of the body for brevity purposes. However, as the human body is relatively symmetrical or mirrored about a line of symmetry (midline), it is hereby expressly contemplated that the bone reamers, implants, devices, systems and methods, and the aspects, components, features and the like thereof, described and/or illustrated herein may be changed, varied, modified, reconfigured or otherwise altered for use or association with another side of the body for a same or similar purpose without departing from the spirit and scope of the invention. For example, the bone reamers, implants, devices, systems and methods, and the aspects, components, features and the like thereof, described herein with respect to the right shoulder may be mirrored so that they likewise function with the left shoulder and vice versa. Further, the bone reamers implants, devices, systems and methods, and the aspects, components, features and the like thereof, disclosed herein are described with respect to the shoulder for brevity purposes, but it should be understood that the implants, devices, systems and methods may be used with other bones of the body having similar structures, for example the lower extremity, and more specifically, with the bones of the ankle, foot, and leg.

Figure 11:
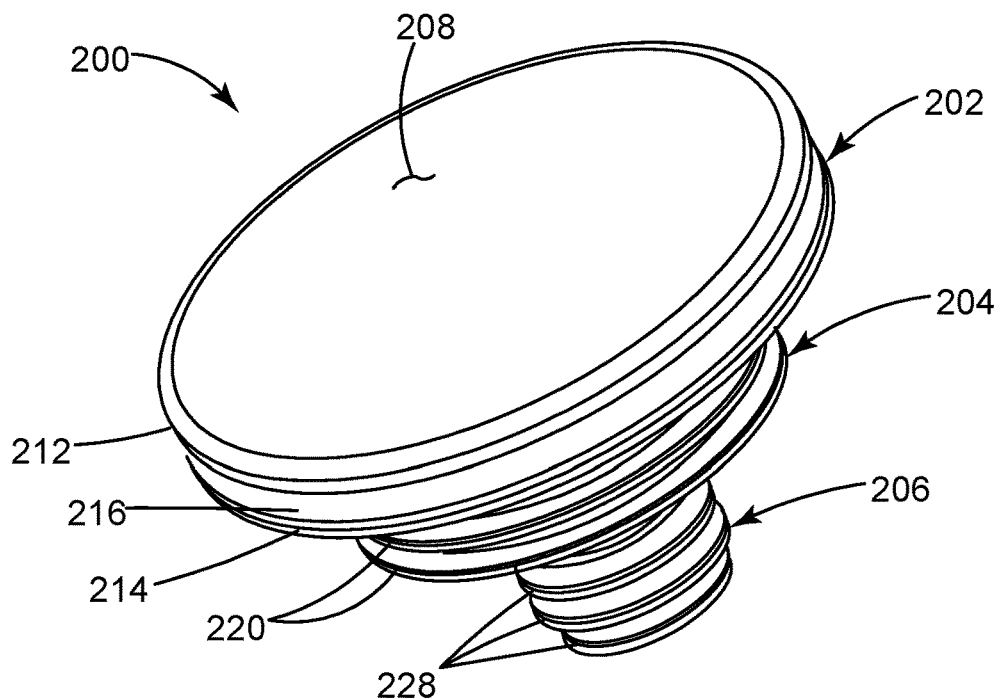
FIG. 11 depicts a top perspective view of an orthopedic implant, in accordance with an aspect of the present invention.
Figure 12:
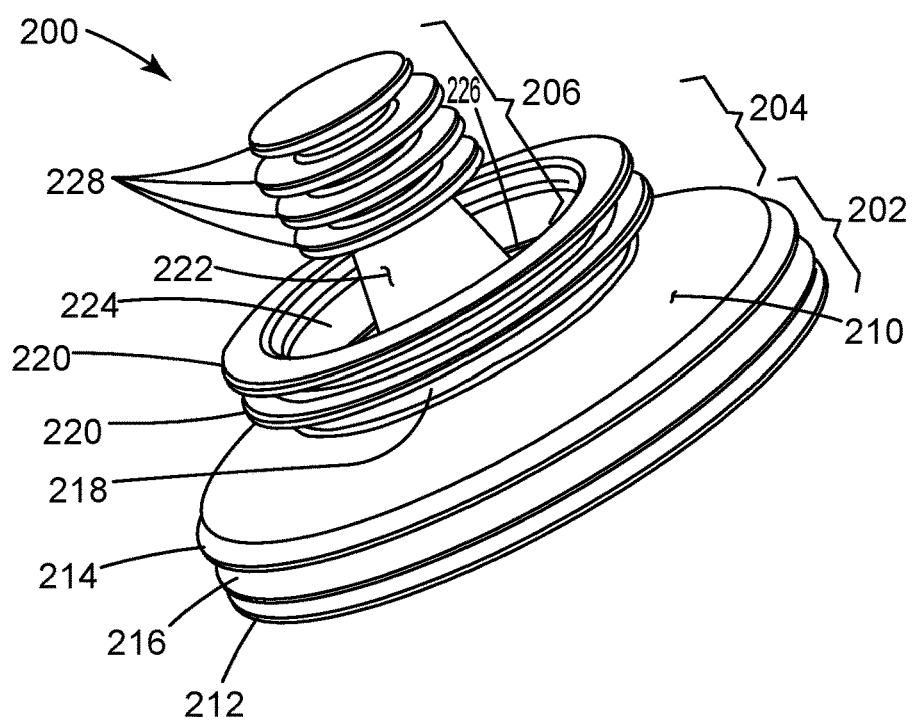
FIG. 12 depicts a bottom perspective view of the orthopedic implant of FIG. 11, in accordance with an aspect of the present invention.
Figure 14:
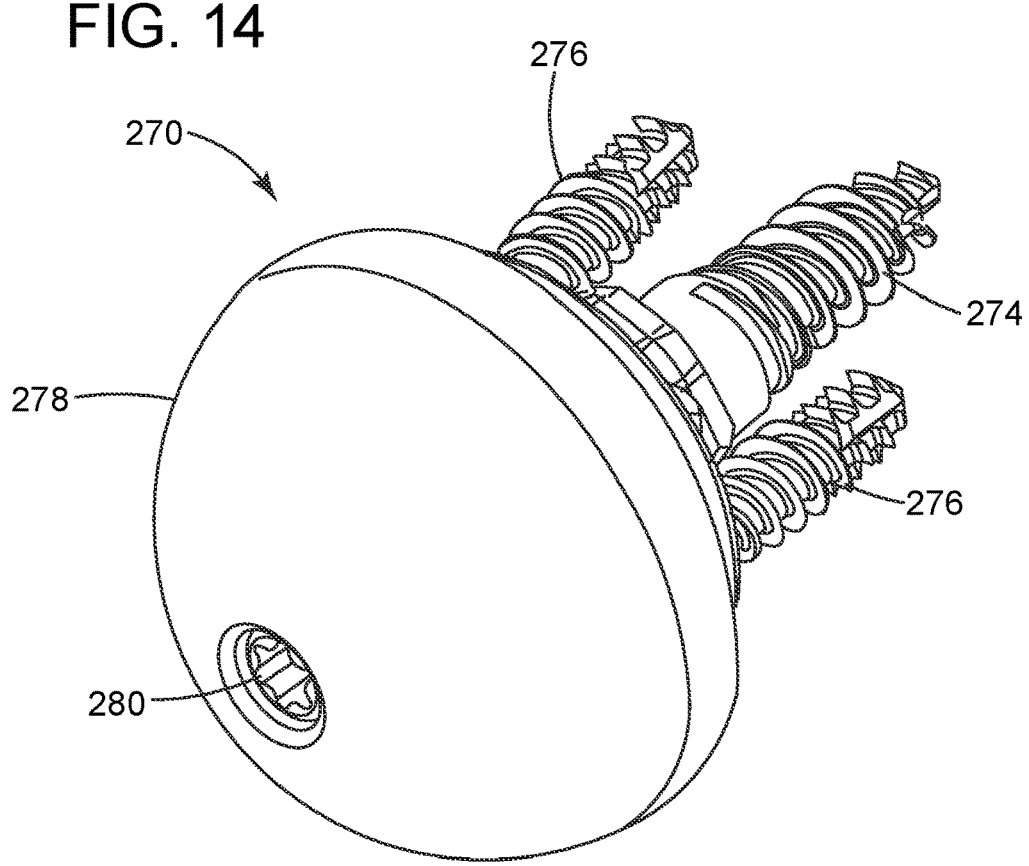
FIG. 14 depicts a bottom perspective view of the reverse implant of FIG. 13, in accordance with the present invention.
Figure 13:
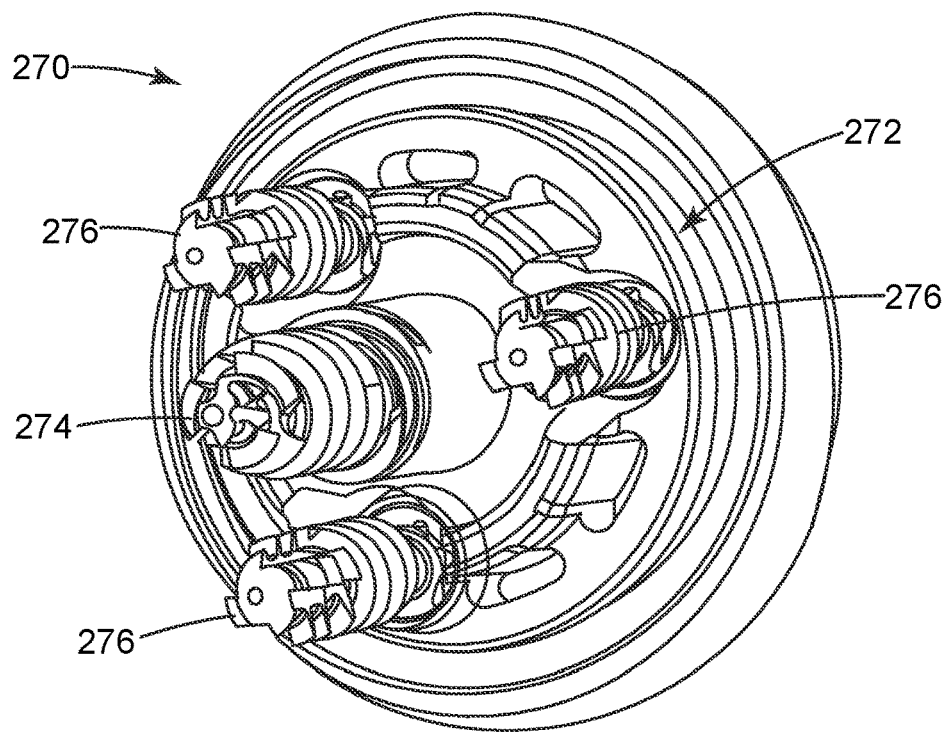
FIG. 13 depicts a top perspective view of a reverse implant, in accordance with the present invention.

Referring to the drawings, like reference numerals are used to indicate like or analogous components throughout the several views. Particularly, FIGS. 1-10 illustrate various views of a bone reamer 100 in accordance with aspects of the present invention. Additionally, FIGS. 11-12 illustrate various views of an implant 200 that is inserted into a bore hole and circular groove formed by the bone reamer 100. Additionally, FIGS. 13-25 shows various steps and devices utilized in a method of preparing a bone for an orthopedic implant.

Referring to FIGS. 1-5, an example of a bottom perspective view (FIG. 1), a top perspective view (FIG. 2), a top view (FIG. 3), a bottom view (FIG. 4) and a side view (FIG. 5) of a bone reamer 100 is depicted in accordance with aspects of the present invention. The bone reamer includes a shaft 102 and a head 104.

The shaft 102 has a first end 106 and a second end 108. The second end 108 of the shaft 100 is configured to connect to a power source (not shown). In the example illustrated in FIGS. 1-5, the second end 108 has three flat surfaces 110 that are configured to fit into the jaws of a drill chuck. However, several other configurations may be used to connect to a power source. For example, the second end 108 may be indirectly connected to a remote power source via transmission system.

Figure 2:
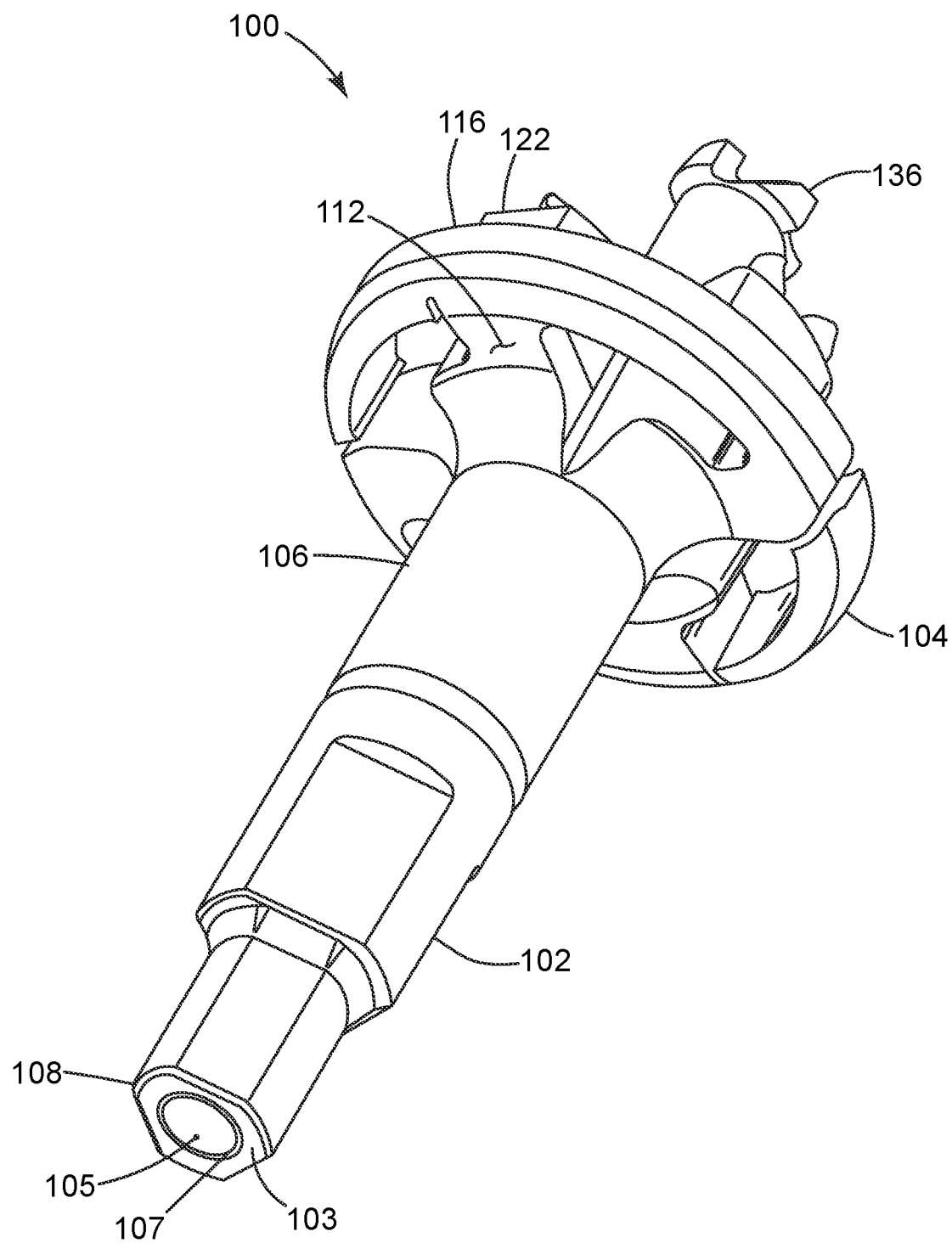
FIG. 2 depicts a top perspective view of the bone reamer of FIG. 1, in accordance with an aspect of the present invention.
Figure 3:
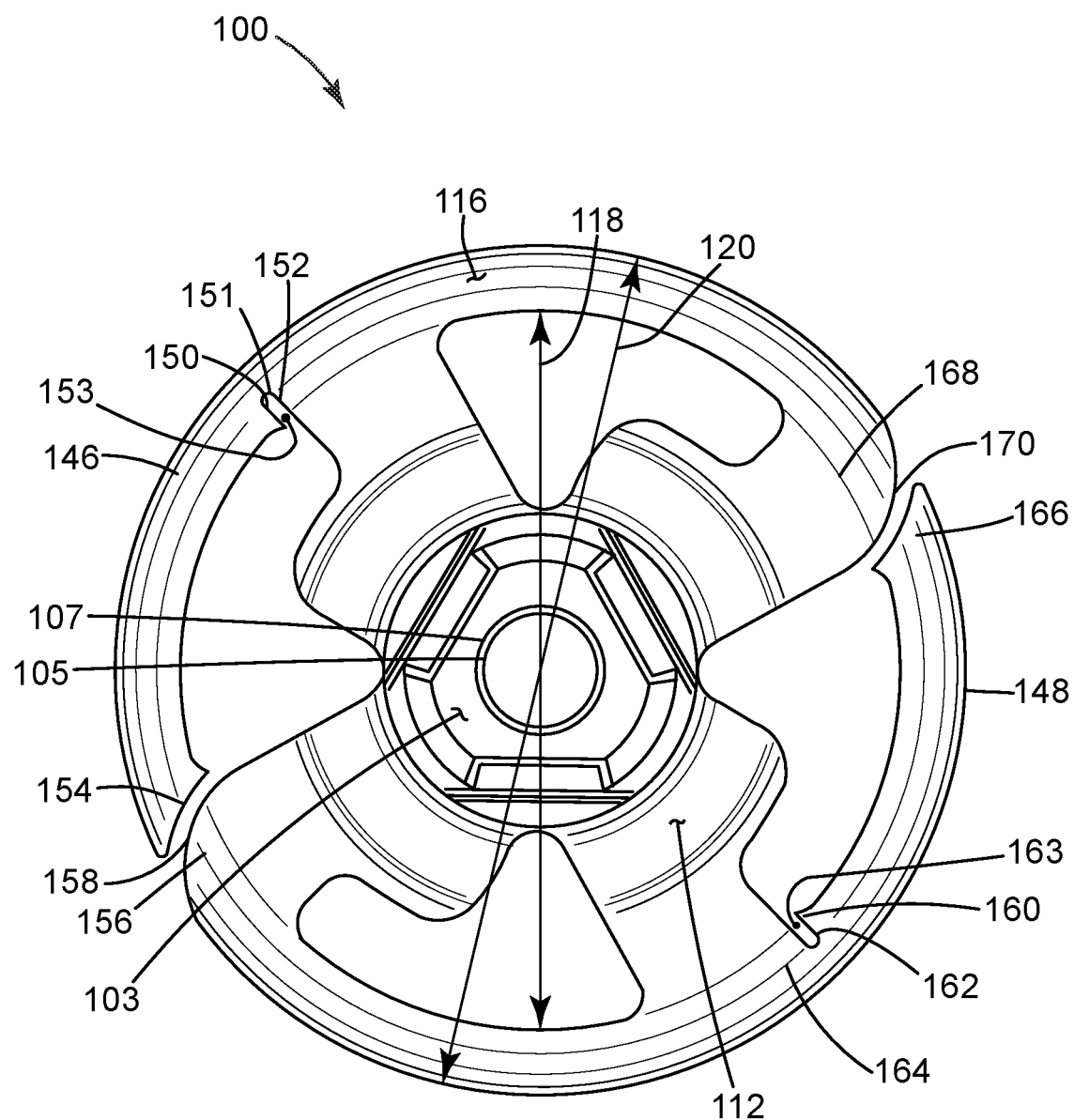
FIG. 3 depicts a top view of the bone reamer of FIG. 1, in accordance with an aspect of the present invention.

The shaft 102 includes a cylindrical outer shell 103 having a hollow central core 105 (best seen in FIGS. 2 and 3). The hollow central core 105 extends through the entire length of the reamer 100. A metallic sleeve 107 may be disposed within the hollow central core 105 within the shaft 102. The metallic sleeve 107 provides structural support to the shaft 102, and may be composed of such metals as, for example, stainless steel. As will be explained in greater detail within, the metallic sleeve 107 and hollow central core 105 are sized to slidably receive a pin 246 (See FIGS. 18 and 19), which is used to accurately position the reamer 100 during the glenoid preparation process.

In order to reduce the manufacturing cost of the reamer 100 or to make the reamer 100 economically disposable, the outer shell 103 may be composed solely of plastic/polymer materials. Such materials may be, for example, nylon, polyphenylsulfone, polysulfone, polyetherimide or polycarbonite.

The head 104 includes a rear face 112, a cutting face 114 and a perimeter portion 116. The rear face 112 is connected to the first end 106 of the shaft 102. In this exemplary case, the rear face 112 is integrally connected to the shaft 102. The cutting face 114 is on an opposing side of the head 104 relative to the rear face 112.

In order to make the reamer 100 economically disposable, the head 104 may be composed solely of plastic/polymer materials, such as, for example, nylon, polyphenylsulfone, polysulfone, polyetherimide or polycarbonite. As provided above, the hollow central core 105 of the reamer 100 passes through the head 104 to enable the reamer 100 to be slid over the pin 246 (See FIG. 19) for purposes of accurately positioning the reamer 100 during use.

Figure 4:
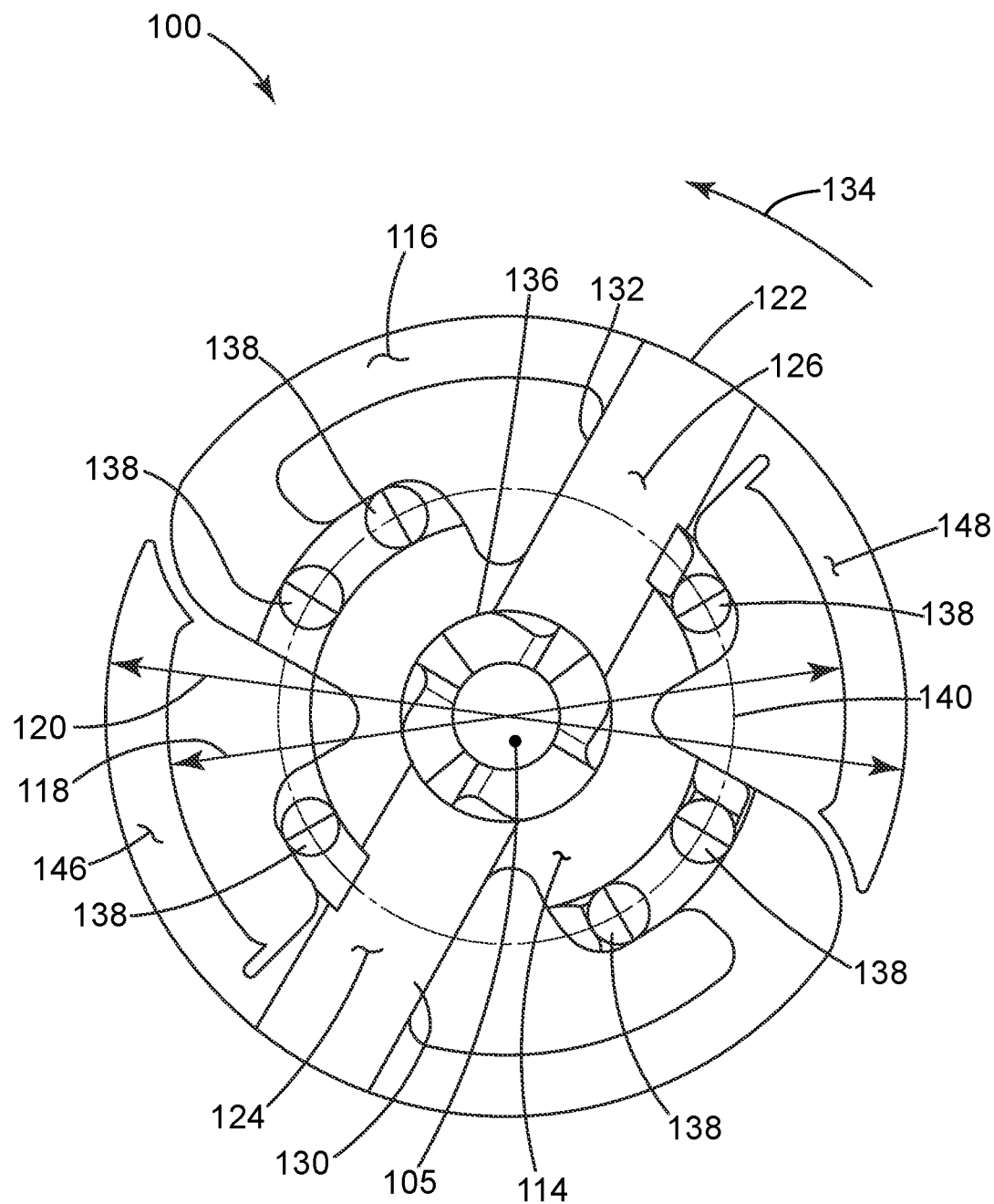
FIG. 4 depicts a bottom view of the bone reamer of FIG. 1, in accordance with an aspect of the present invention.
Figure 5:
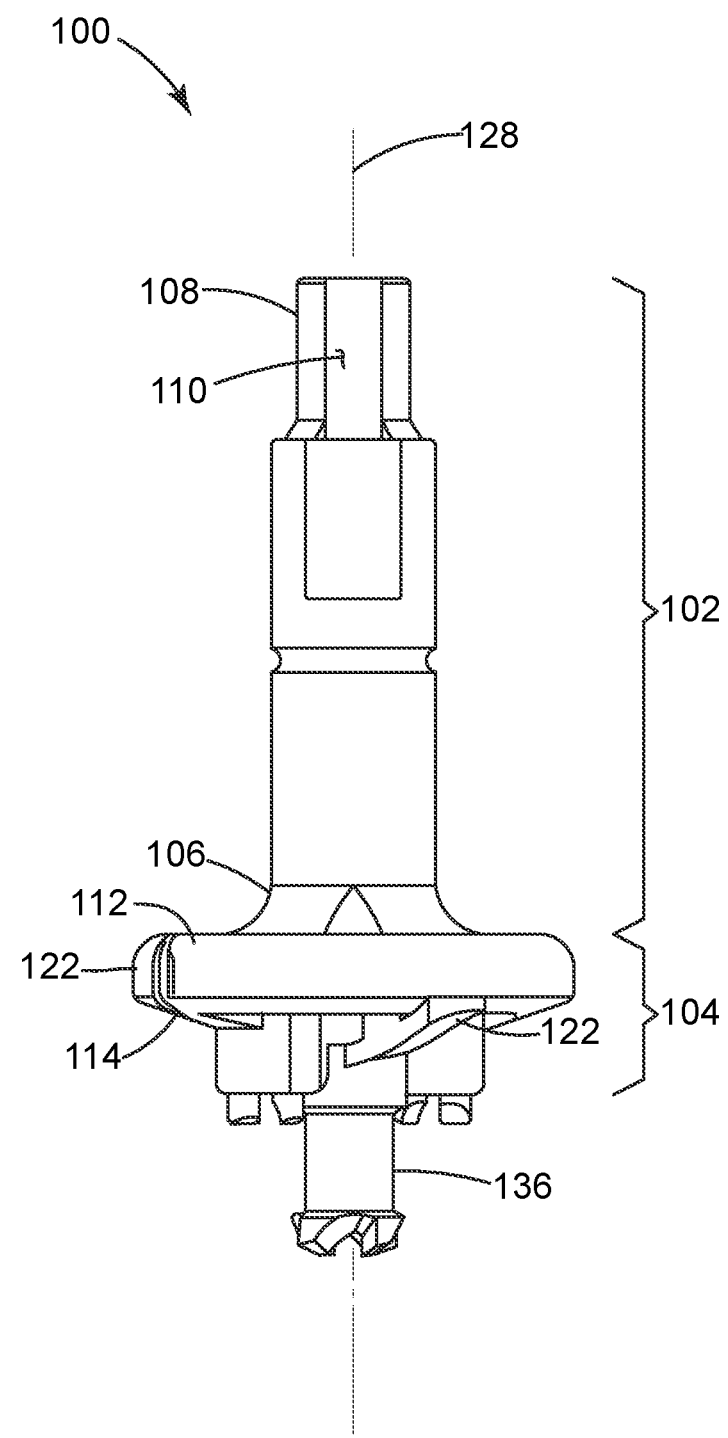
FIG. 5 depicts a side view of the bone reamer of FIG. 1, in accordance with an aspect of the present invention.
Figure 6:
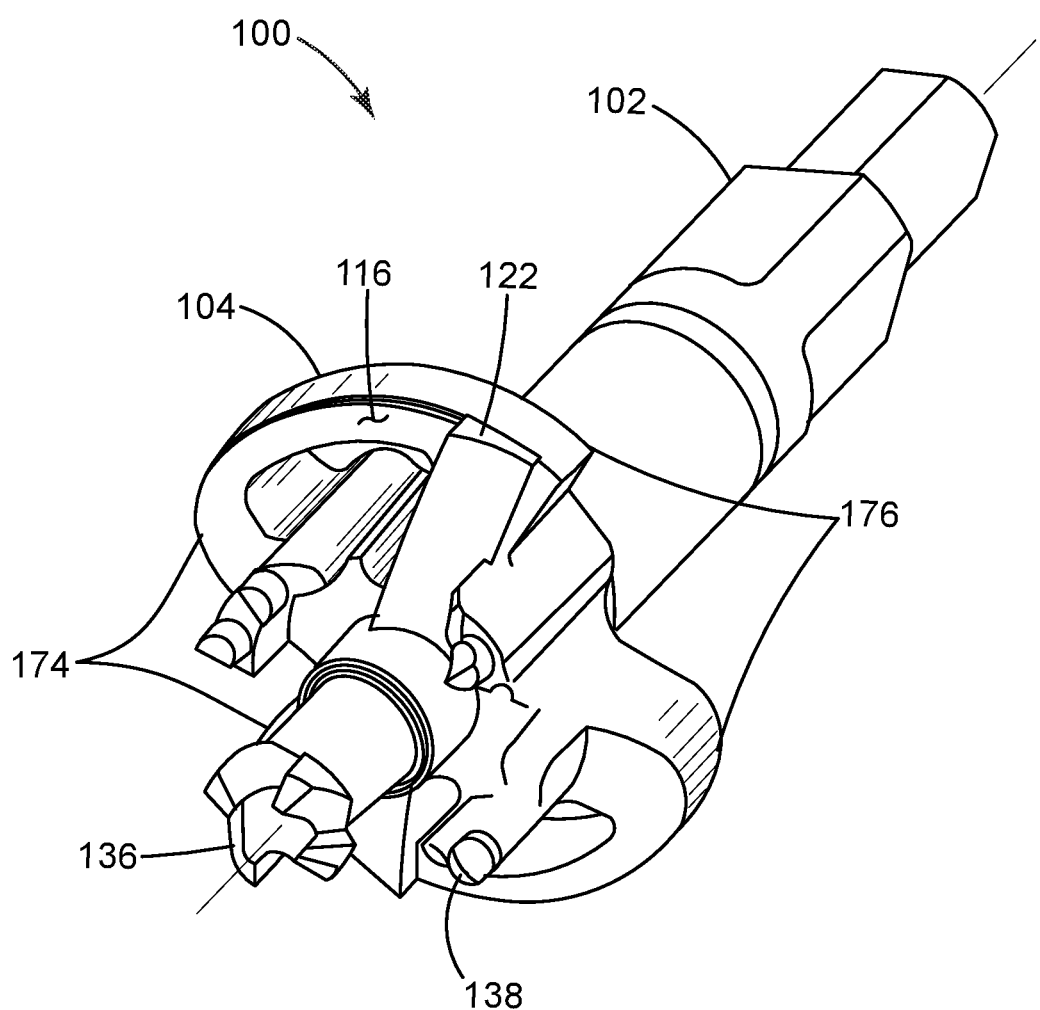
FIG. 6 depicts a bottom perspective view of the bone reamer of FIG. 1 with two removable members removed to form a bowtie shaped bone reamer, in accordance with an aspect of the present invention.
Figure 7:
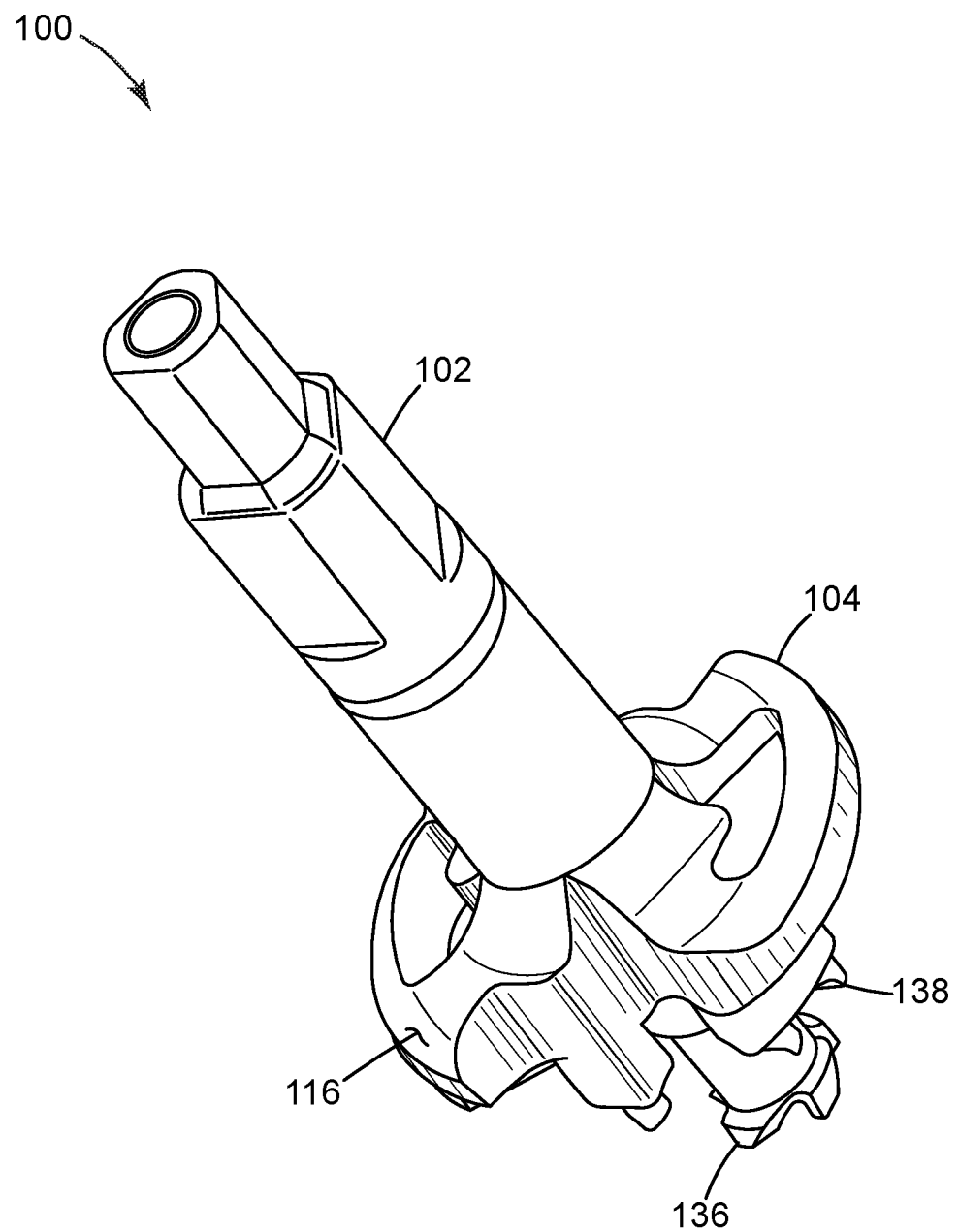
FIG. 7 depicts a top perspective view of the bone reamer of FIG. 6, in accordance with an aspect of the present invention.
Figure 8:
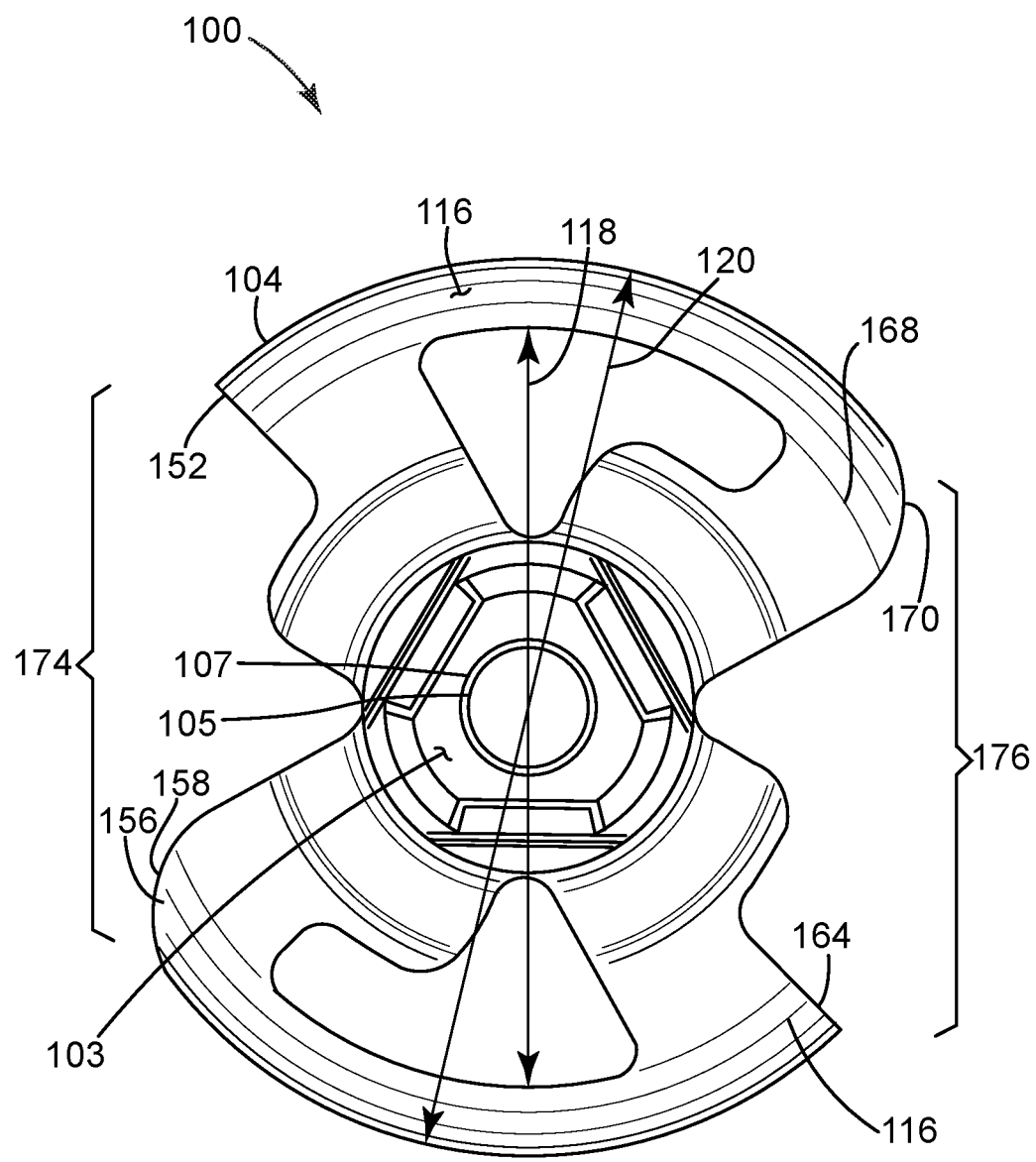
FIG. 8 depicts a top view of the bone reamer of FIG. 6, in accordance with an aspect of the present invention.

The perimeter portion 116 has an inner perimeter diameter 118 and an outer perimeter diameter 120 (See FIGS. 3 and 4). The outer perimeter diameter 120 defines the outer boundaries of the rear face 112 and the cutting face 114. Additionally, the upper surface to the perimeter portion 116 is a part of the rear face 112 and the lower surface of the perimeter portion 116 is a part of the cutting face 114.

A blade member 122 is disposed upon the cutting face 114. The blade member 122 extends at least across the inner perimeter diameter 118 of the perimeter portion 115. However, in the example illustrated in FIGS. 1-5, the blade member 122 extends entirely across the outer perimeter diameter 120 such that it is flush with the outermost boundaries of the perimeter portion 116.

The blade member 122 is broken into a first blade portion 124 and a second blade portion 126, which extend in opposite directions from a center axis 128 (See FIG. 4) of the reamer 100. The first blade portion 126 is angled to a first cutting edge 130 and the second blade portion 128 is angled to a second cutting edge 132 (See FIGS. 1 and 4).

The first and second cutting edges 130, 132 are disposed on opposing sides of the blade member 122. As such, when the bone reamer 100 is rotated in the counterclockwise direction when looking from a bottom view (as shown by directional arrow 134 in FIG. 4) both cutting edges 130, 132 rotate as the leading edges of the blade member 122. It is these cutting edges 130, 132 that are utilized by reamer 100 to cut a smooth circular surface 252 (See FIG. 20) into a portion of a bone, such as, for example, the glenoid cavity of a scapula.

A center drill bit 136 is disposed on the cutting face 114 of the head 104 between the first and second cutting edges 130, 132 of the blade member 122. The center drill bit 136 and the blade member 122 are concentric with the center axis 128 of the reamer 100. In this case, the center drill bit 136 straddles the central portion of the blade member 122. It is the center drill bit 136 that is utilized by the bone reamer 100 to drill a center bore hole 256 (best seen in FIG. 20) into a portion of a bone, such as the glenoid cavity of a scapula.

Both the center drill bit 136 and the blade member 122 each have aligned central through-holes that are part of the hollow central core 105 of the reamer 100. The center axis 128 extends through the center of the hollow central core 105. As will be explained in greater detail within, the hollow central core 105 is sized to slidably receive the pin 246 (See FIG. 19), which is used to accurately position the reamer 100 during the bone preparation process.

Advantageously, the combination of the blade member 122 and center drill bit 136 enables the reamer 100 to cut a smooth circular surface 252 (See FIG. 20) and drill a center bore hole 256 (See FIG. 20) substantially simultaneously in one preparation step. Combining both bone preparation steps of reaming and drilling into one procedure reduces time and the risk of damage to the bone. Further, the center bore hole 256 produced by the drill bit 136 will be more precisely located in the center of the smooth circular surface 252 produced by the blade member 122 when both procedures are done simultaneously.

The bone reamer 100 also includes a plurality of cutting pegs 138 (See FIG. 4) that are disposed symmetrically around an inner circumference 140 (See FIG. 4) of the cutting face 114. The inner circumference 140 is concentric with the center axis 128 of the reamer 100 and has a smaller diameter than the outer perimeter diameter 120 of the perimeter portion 116. The inner circumference 140, in the example illustrated, has a diameter that is smaller than the inner perimeter diameter 118 of the perimeter portion 116 as well.

The cutting pegs 138 may be at least two in number. In the example illustrated in FIGS. 1-5, there are sized pegs 138 distributed around the inner circumference 140. However, any number of pegs 138 may be utilized depending on application parameters.

Each peg 138 has a generally cylindrical body that has an upper end portion 142 (See FIG. 1), which is extending away from the cutting face 114 of the head 104. Each peg 138 also includes a peg cutting blade 144 that is disposed on the upper end portion 142. The peg cutting blades 144 are operable to cut through bone as the bone reamer 100 is rotated. It is the plurality of pegs that are utilized by the bone reamer 100 to drill a circular groove 254 (See FIG. 20) into a portion of a bone, such as, for example, the glenoid cavity of a scapula.

Advantageously, the combination of the blade member 122, center drill bit 136 and the pegs 138 enable the reamer 100 to cut a smooth circular surface 252, drill a center bore hole 256 and create a circular groove 254 substantially simultaneously in one step. Combining the three bone preparation steps into one procedure reduces time and the risk of damage to the bone. Further, the center bore hole 256 produced by drill bit 136 and the circular groove 254 produced by the pegs 138 will be more precisely located relative to each other as well as in the center of the smooth circular surface 252 produced by the blade member 122 when all three procedures are done in the same bone preparation step. Additionally, the bone reamer 100 may position the center bore hole 256, circular groove 254 and smooth circular surface 252 such that they all more accurately concentric with each other then they would have been if performed in separate steps.

The perimeter portion 116 of the head 104 includes a first removable member 146 and a second removable member 148 (See FIG. 3). The first and second removable members may each form a circular arc spanning an angular range of between 30 to 90 degrees. However, other appropriate arc sizes may be utilized depending on application parameters.

As seen in FIG. 3, the first removable member 146 includes a first end 150 having a breakable connection 151 to an adjacent first section 152 of the perimeter portion. The first end 150 is configured to break off of the first section 152 when a predetermined torque or force is applied to the first removable member 146.

In the example illustrated in FIGS. 1-5, the breakable connection 151 includes a channel 153 formed into the perimeter portion 116, which extends partially along the width of the perimeter portion 116 to leave a reduced width of the perimeter portion 116. However, other breakable connections may also be utilized. For example, the breakable connection 151 may include one or more small through holes drilled along the width of the perimeter portion 116.

The first removable member 146 also includes a second end 154 that is spaced apart from an adjacent second section 156 of the perimeter portion 116. The second section 156 of the perimeter portion 116 has solely rounded surfaces 158 disposed between the rear face 112 and the cutting face 114 of the head 104.

The second removable member 148 of the perimeter portion 116 includes a third end 160 having a breakable connection 162 to an adjacent third section 164 of the perimeter portion 116. In the same manner as the first removable member 146, the third end 160 is configured to break off of the third section 164 when a predetermined torque or force is applied to the second removable member 148.

In the example illustrated in FIGS. 1-5, the breakable connection 162 includes a channel 163 formed into the perimeter portion 116, which extends partially along the width of the perimeter portion 116 to leave a reduced width of the perimeter portion 116. However, other breakable connections may also be utilized. For example, the breakable connection 162 may include one or more small through holes drilled along the width of the perimeter portion 116.

The second removable member 148 of the perimeter portion 116 also includes a fourth end 166 that is spaced apart from an adjacent fourth section 168 of the perimeter portion 116. The fourth section 168 of the perimeter portion 116 has solely rounded surfaces 170 disposed between the rear face 112 and the cutting face 114 of the head 104.

Advantageously, the first and second removable members 146, 148 may be snapped off of the perimeter portion 116 to form a "half moon" reamer or a "bowtie" reamer (See FIGS. 6-10) depending on the preference of a surgeon utilizing the reamer 100. When the bone reamer 100 is rotated in the counterclockwise direction, when looking from a bottom view, (as shown by directional arrow 134 in FIG. 4) the rounded surfaces 158 and 170 of the exposed adjacent sections 156, 166 rotate as leading edges of the perimeter portion 116. Accordingly, the risk of cutting, tearing or otherwise damaging any surrounding soft tissue is minimized by the shape of the rounded surfaces 158, 170.

Additionally, when the bone reamer 100 is rotated in the counterclockwise direction when looking from a bottom view (directional arrow 134, FIG. 4), the ends of the first and third sections 152, 164, where there might be sharp corners due to the breaking off of the removable members 146, 148, rotate as trailing edges of the perimeter portion 116. This too helps to avoid damage to any surrounding soft tissue.

Referring to FIGS. 6-10, an example of a bottom perspective view (FIG. 6), a top perspective view (FIG. 7), a top view (FIG. 8), a bottom view (FIG. 9) and a side view (FIG. 10) of the bone reamer 100 with the two removable members 146, 148 removed is depicted in accordance with aspects of the present invention. In the embodiment shown in FIGS. 6-10, both removable members 146, 148 have been removed to form a bowtie shaped configuration (See FIGS. 8 and 9) of reamer 100.

All other aspects of reamer 100 as illustrated in FIGS. 6-10 remain the same as reamer 100 as illustrated in FIGS. 1-5. Therefore, the discussion relevant to FIGS. 1-5 also applies to FIGS. 6-10 and will not be repeated here for brevity sake.

With the removal of first removable member 146, a first perimeter concavity 174 is formed. With the removal of the second removable member 148, a second perimeter concavity 176 is formed. In the example illustrated in FIGS. 6-10, the first and second concavities 174, 176 form the bowtie shaped configuration of reamer 100. However, if only one of the removable members 146, 148 had been removed, the single perimeter concavity 174, 176, would form a half-moon shaped configuration of reamer 100.

Figure 9:
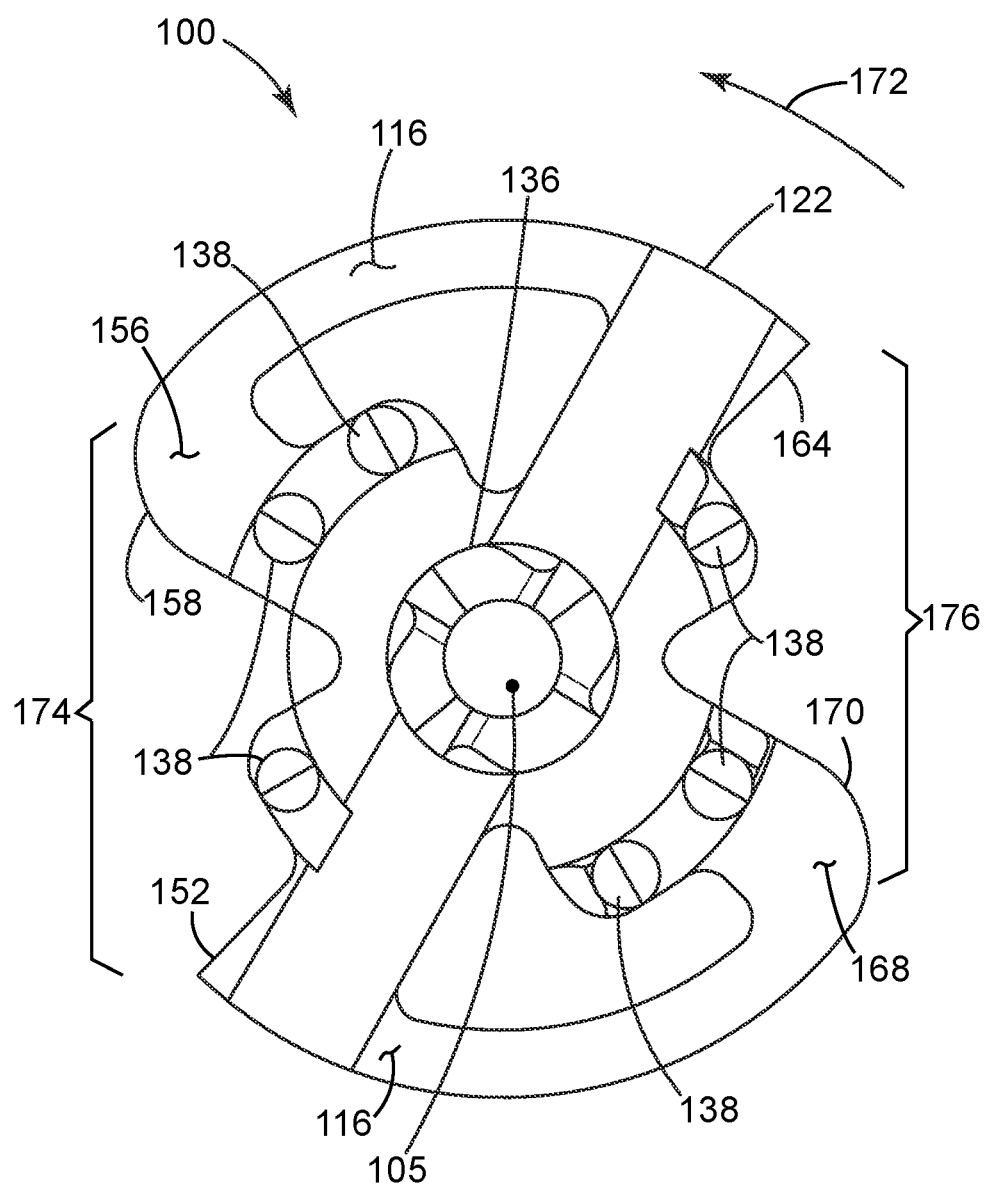
FIG. 9 depicts a bottom view of the bone reamer of FIG. 6, in accordance with an aspect of the present invention.
Figure 10:
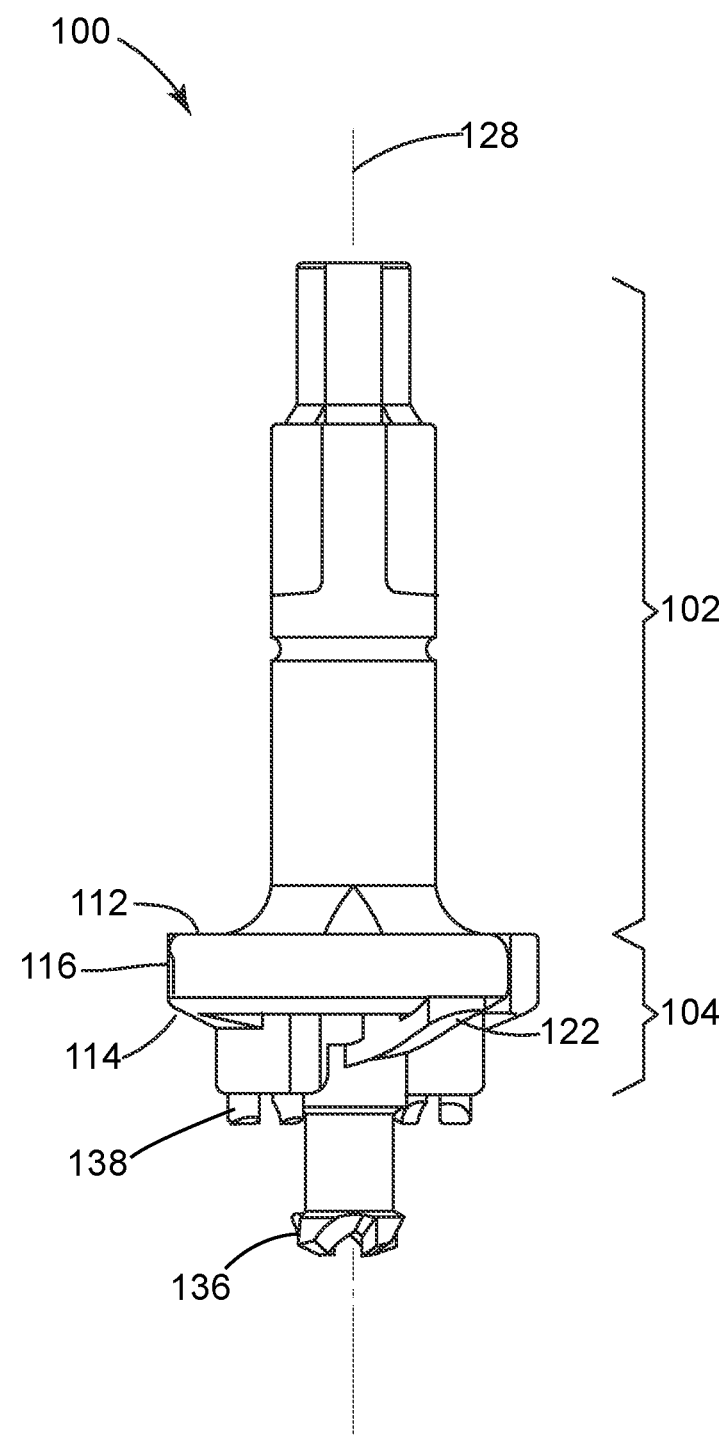
FIG. 10 depicts a side view of the bone reamer of FIG. 6, in accordance with an aspect of the present invention.

Referring more specifically to FIG. 9, the rounded surface 158 of second section 158 and the rounded surface 170 of the fourth section 168 can clearly be seen. When the bone reamer 100 is rotated in the counterclockwise direction when looking from a bottom view (as shown by directional arrow 172 in FIG. 9) the rounded surfaces 158 and 170 of the exposed adjacent sections 156, 168 rotate as leading edges of the perimeter portion 116. Accordingly, the risk of cutting, tearing or otherwise damaging any surrounding soft tissue is minimized by the shape of the rounded surfaces 158, 170.

Additionally, when the bone reamer 100 is rotated in the counterclockwise direction when looking from a bottom view (directional arrow 172, FIG. 9) the ends of the first and third sections 152, 164, where there might be sharp corners due to the breaking off of the removable members 146, 148, rotate as trailing edges of the perimeter portion 116. This too helps to avoid damage to any surrounding soft tissue.

Referring to FIGS. 11 and 12, a top perspective view (FIG. 11) and a bottom perspective view (FIG. 12) of an orthopedic implant 200 for use with the bone reamer 100 is depicted, in accordance with an aspect of the present invention. In this example, implant 200 is configured as a specific glenoid implant to be implanted into a prepared glenoid bone. However, other configurations of implants may also be used. Several examples of implants that are within the scope of this present invention are disclosed in: international application no. PCT/US2019/043983, filed on Jul. 29, 2019; international application no. PCT/US2019/043986, filed on Jul. 29, 2019; and international application no. PCT/US2019/043990, all of which are incorporated herein by reference in their entirety.

The implant 200 includes a lateral portion 202, an intermediate ring portion 204 and a medial post portion 206. The lateral portion 202 has a concave upper surface 208 that is configured to conform to a humeral head of a humeral implant construct. The lateral portion 202 also includes a tapered lower surface 210 that is configured to engage with a smooth circular surface 252 (See FIG. 20) of a glenoid cavity of a scapula. The smooth circular surface 252 is prepared with the use of the reamer 100 on the glenoid cavity. The lateral portion also includes a first and a second rim 212, 214, which define a channel 216 therebetween.

The intermediate ring portion 204 includes a base member 218 which contacts and extends away from the tapered lower surface 210 of the lateral portion 202. A pair of fins 220 extend around the circumference of the ring portion 204. The fins 220 are shown as a pair, however there may be any number of fins depending on application parameters. The fins 220 are configured to fit into and lockingly engage a circular groove 254 disposed in a glenoid cavity by reamer 100. The fins 220, and base 218 form a circular recessed area 224 that has a recessed bottom surface 226.

The medial post portion 206 includes a stem 222 that extends into the recessed area 224 and abuts the bottom surface 226 of the portion 204. The post portion 206 also includes one or more fins 228 that extend around the circumference of the stem 222. The fins 228 are configured to fit into and lockingly engage a center bore hole 256 disposed in a glenoid cavity by a reamer 100.

It is further contemplated that reamer 100 may also be used to prepare the glenoid cavity in the event of a reverse shoulder implant system is used. More specifically, referring to FIGS. 13 and 14, a top perspective view (FIG. 13) and a bottom perspective view (FIG. 14) of an alternative embodiment of an orthopedic implant 270 for use with the bone reamer 100 is depicted. In this embodiment, the orthopedic implant is a reverse implant 270. The reverse implant 270 includes a baseplate 272, a central screw 274, a glenosphere 278, and a post 280 for connecting the glenosphere 278 to the base plate 272. The central screw 274 is configured to fit into and lockingly engage a center bore hole 256 disposed in the glenoid cavity by the reamer 100. An at least one peripheral screw 276 is configured to fit into and lockingly engage the circular groove 254 created in the glenoid cavity by the reamer 100.

Figure 15:
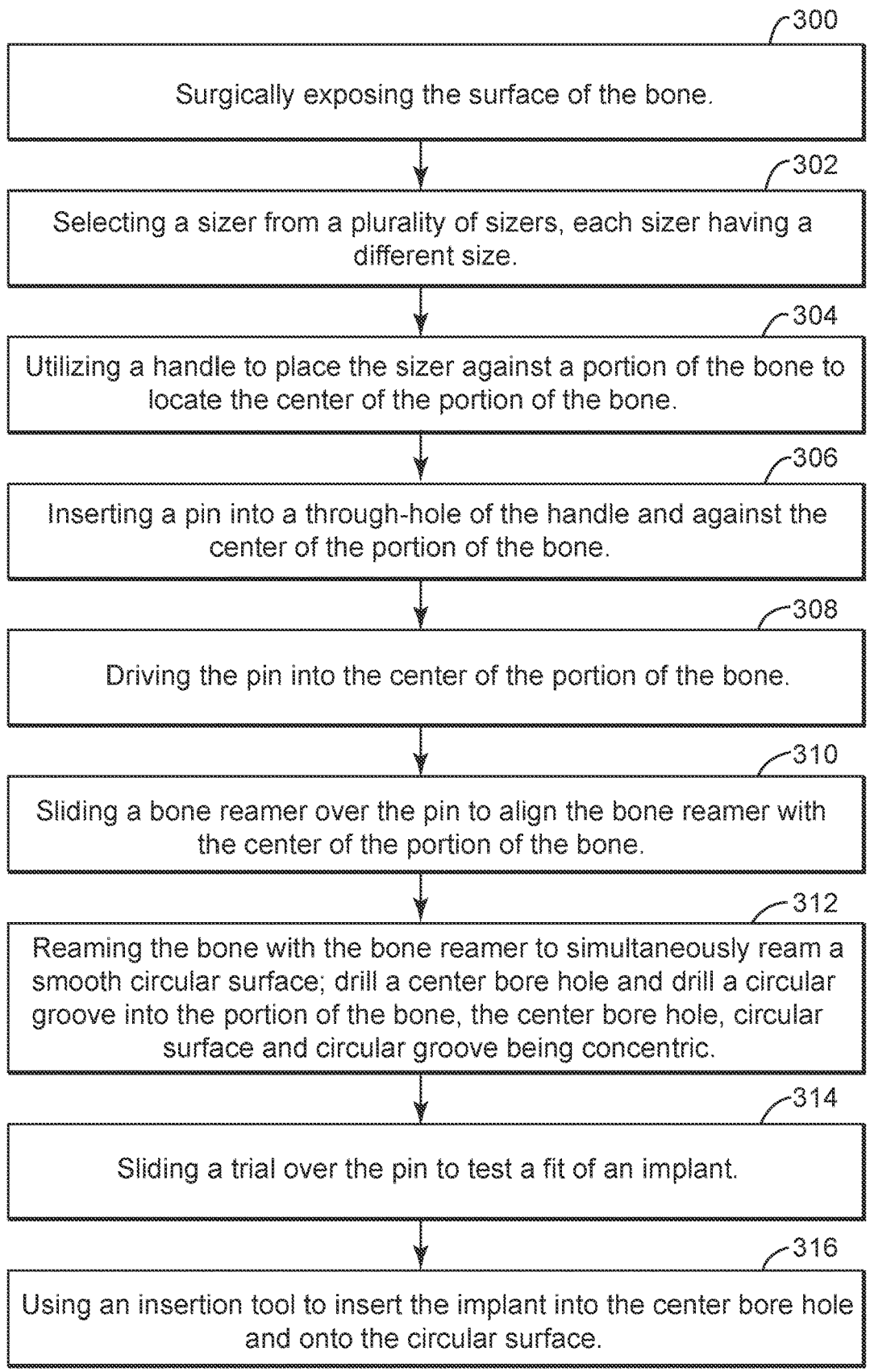
FIG. 15 depicts a block diagram of a method of surgically preparing a bone to receive an orthopedic implant, in accordance with an aspect of the present invention.

Referring to FIGS. 15-27, a method of surgically implanting an orthopedic implant into a bone, in accordance with an aspect of the present invention, is depicted. In this particular case, the method will be used to implant an orthopedic implant into the glenoid cavity of a scapula. However, the method may be used to implant other orthopedic implants into other bones as well. FIG. 15 depicts a block diagram of the method steps in accordance with the present invention. FIGS. 16-27 support the various steps of the method.

Figure 16:
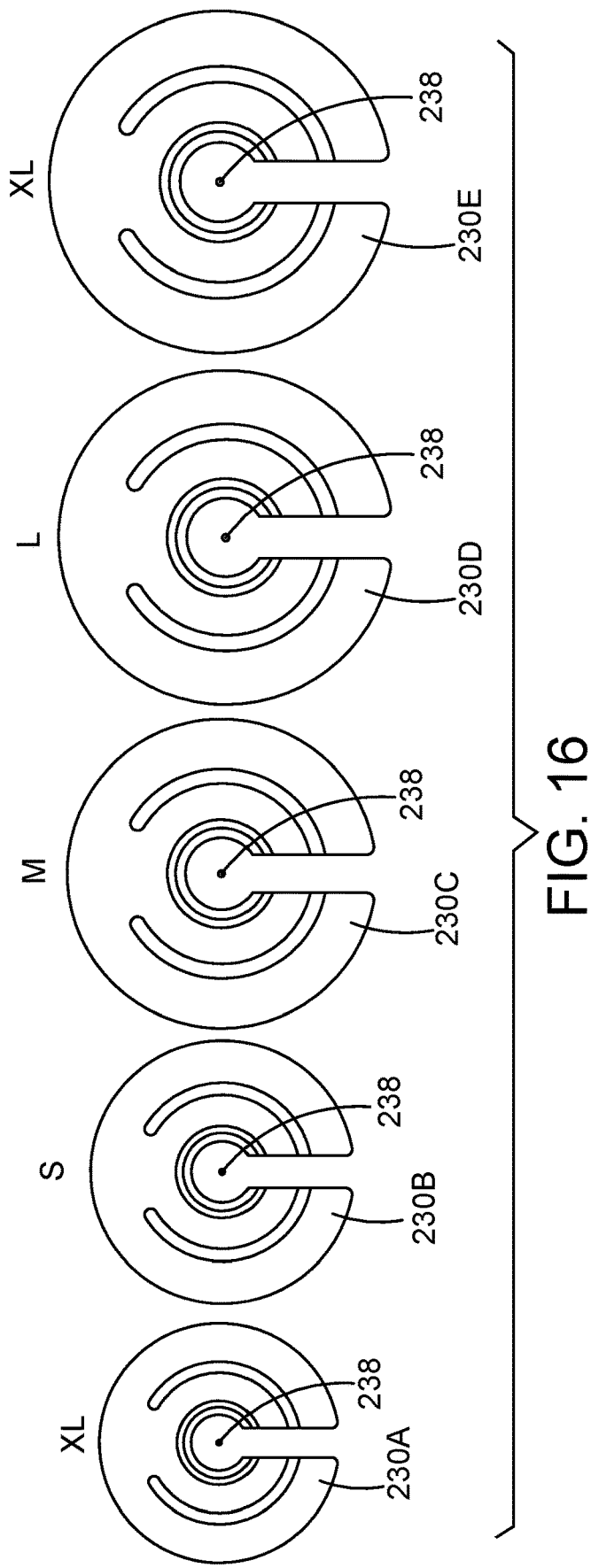
FIG. 16 depicts a perspective view of a kit having various sizers of bone reamers, in accordance with the present invention.

Referring to FIG. 16, a perspective view of a selection of sizers 230 that would be present in a kit, in accordance with the present invention, is depicted. After surgically exposing the surface of a glenoid cavity 242 (See FIGS. 16, 18 and 19) of a patient (ref 300 in FIG. 13), a sizer 230 is selected from a plurality of sizers 230A, B, C, D, E (collectively 230) (ref. 302 in FIG. 13). The sizers 230 are generally disc shaped and may range in size from extra-small 230A to extra-large 230E. The sizers 230 are used to measure and verify the size of the patient's glenoid cavity 242. Each sizer 230 has a center hole 238.

Figure 17:
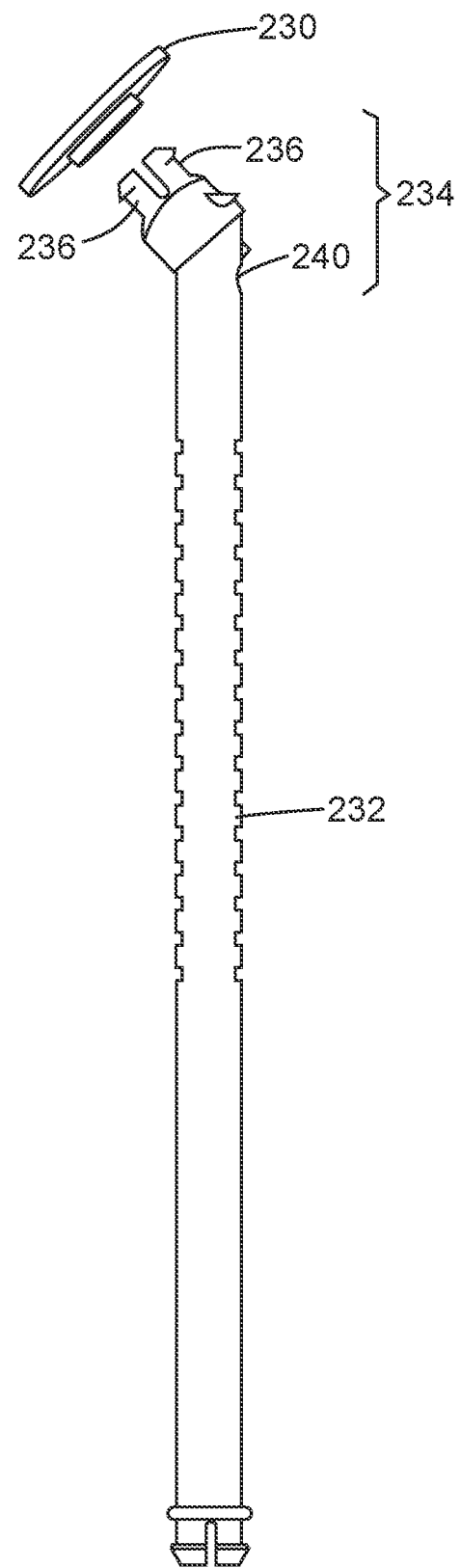
FIG. 17 depicts a perspective view of a handle, in accordance with the present invention.

Referring to FIG. 17, a perspective view of a handle 232, in accordance with the present invention, is depicted. The handle 232 is used to engage the selected sizer 230. The handle includes a pronged end portion 234 that is bent at an acute angle. The end portion 234 has prongs 236 for engaging and aligning with the center hole 238 of a sizer 230.

Figure 18:
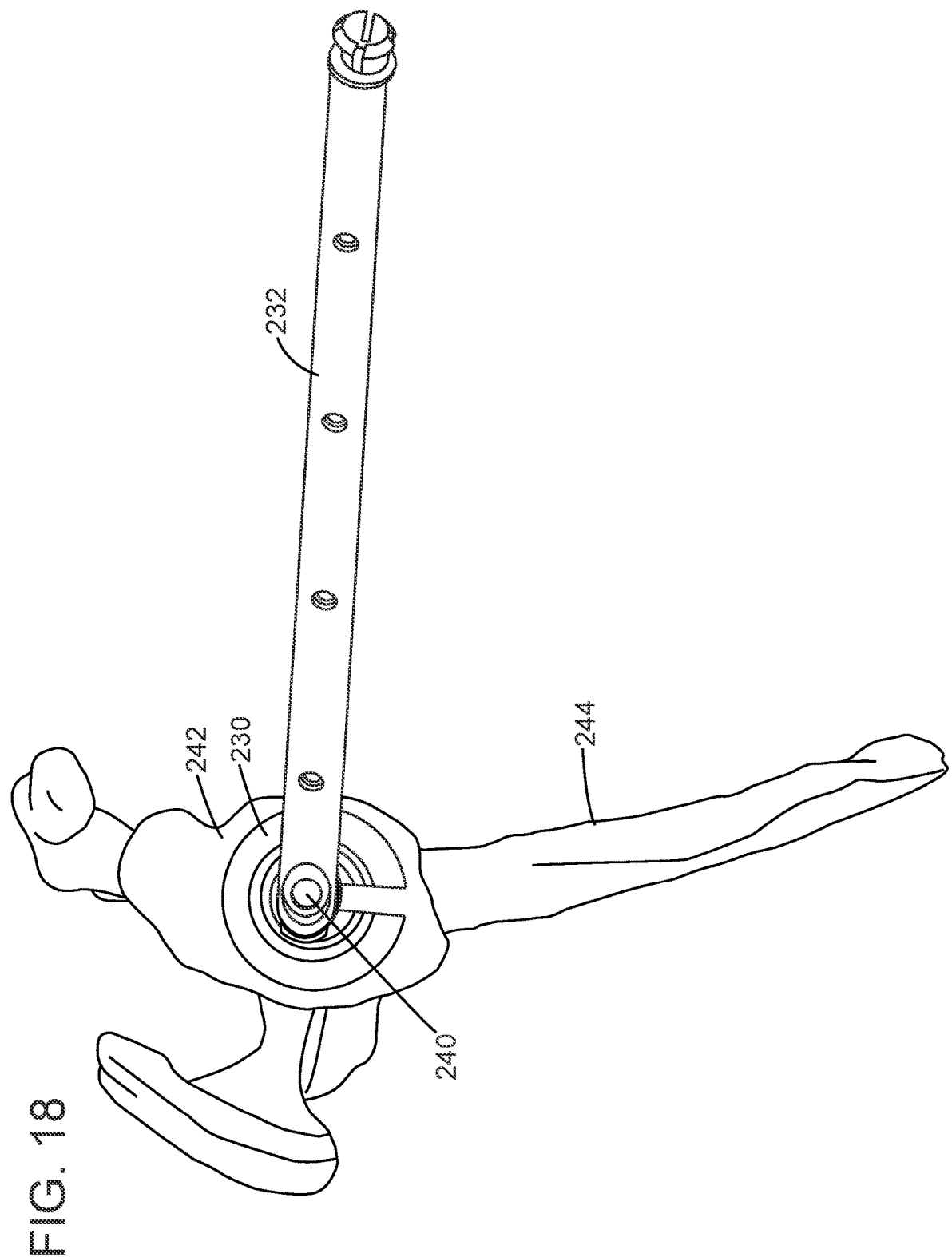
FIG. 18 depicts a perspective view of the handle and sizer placed in a glenoid cavity of a patient, in accordance with the present invention.

The handle also includes a through-hole 240 (See FIG. 18). The through-hole 240 is aligned with the center hole 238 of the sizer 230, when the prongs 236 engage with the center hole 238 of the sizer 230.

Referring to FIG. 18, a perspective view of the handle 232 and sizer 230 placed in the glenoid cavity 242 of the patient, in accordance with the present invention, is depicted. The handle 232 is utilized to place the selected sizer 230 against the glenoid cavity 242 of the scapula 244 of the patient to measure the size of the glenoid cavity 242 and to locate the center 243 of the glenoid cavity 242 (ref. 304 in FIG. 13). If the size of the glenoid cavity 242 does not match the selected sizer 230, other sizers 230 are selected from a kit until there is a match. Once a match is made, the center hole 238 of the sizer 230 is aligned with the center 243 (See FIG. 21) of the glenoid cavity 242.

Figure 19:
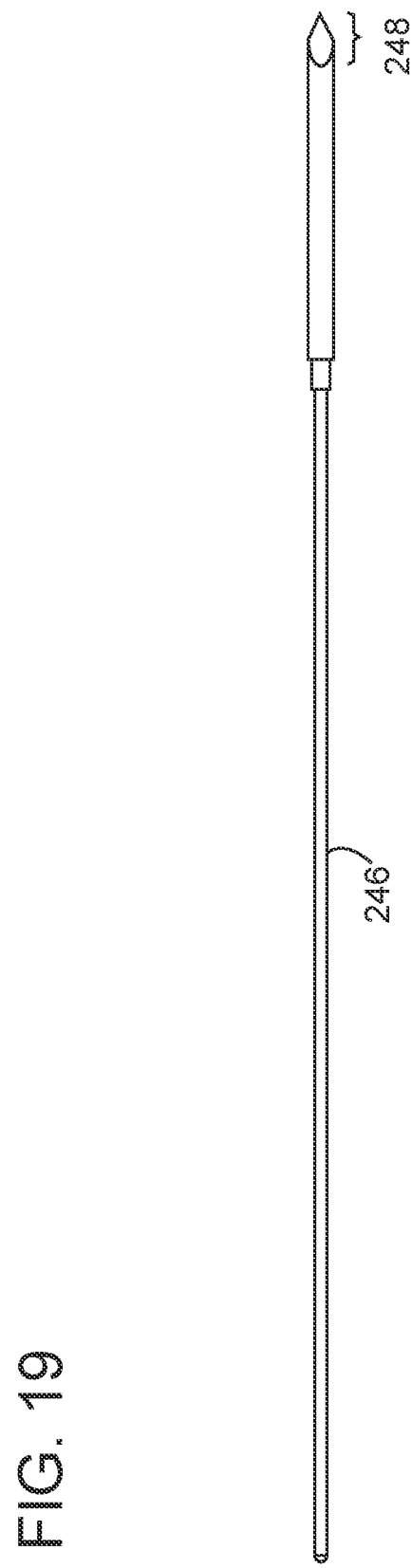
FIG. 19 depicts a perspective view of a pin, in accordance with the present invention.

Referring to FIG. 19, a perspective view of the pin 246, in accordance with the present invention, is depicted. The pin 246 includes a pointed tip end 248 that is operable to penetrate the bone of the glenoid cavity.

Figure 20:
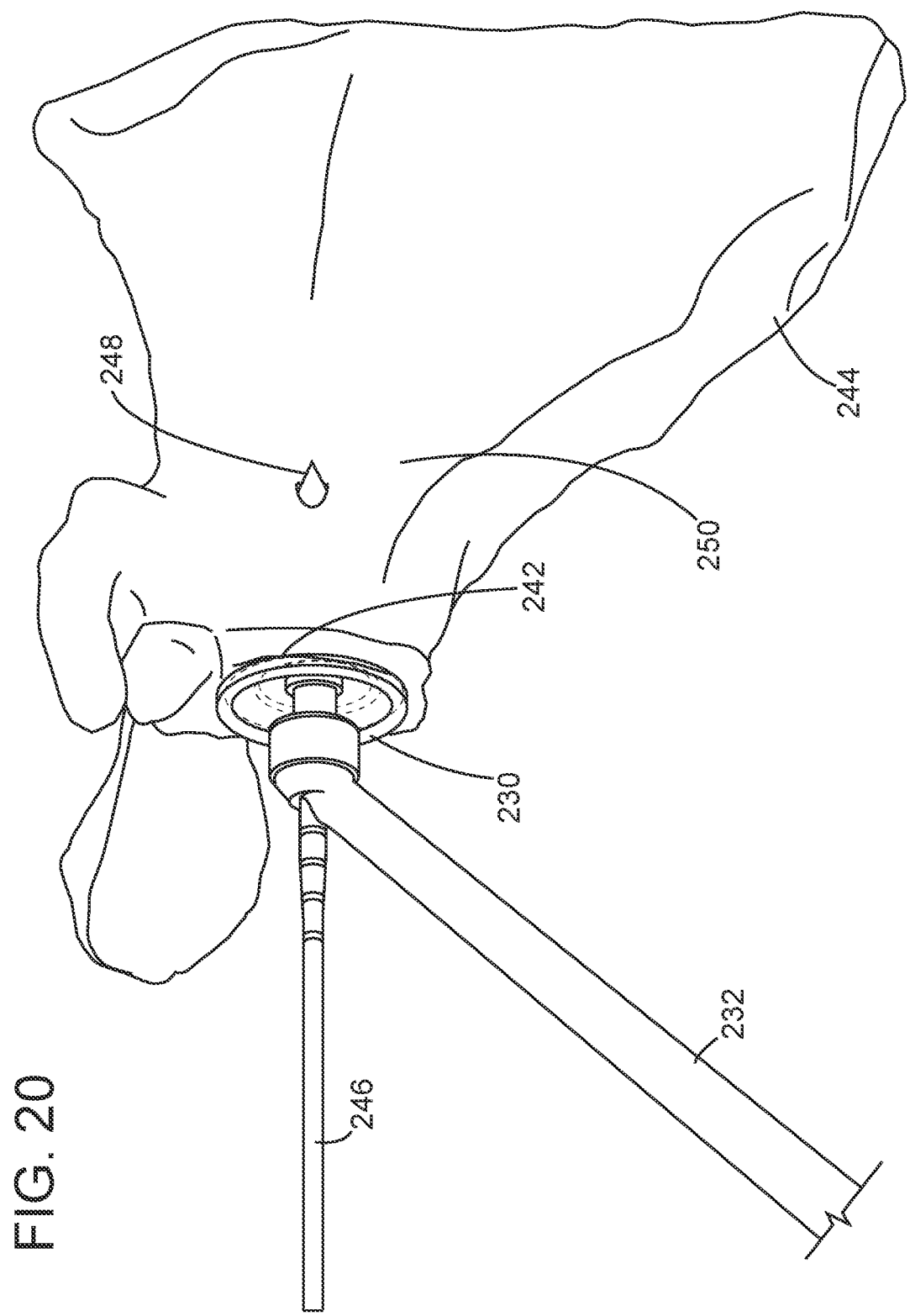
FIG. 20 depicts a perspective view of the pin inserted into a through-hole of a handle, in accordance with the present invention.

Referring to FIG. 20, a perspective view of the pin 246 inserted into the through-hole 240 of the handle 232, in accordance with the present invention, is depicted. The selected pin 246 is next inserted into the though-hole 240 of the handle 232 and the tip end 248 is abutted against the center 243 of the glenoid cavity 242 (ref. 306 in FIG. 15). The pin 246 is then driven into the scapula 244 (ref. 308 in FIG. 15). The tip end 248 penetrates the scapula 244 at the center 243 of the glenoid cavity 242 and protrudes out of the scapula's neck region 250. As such, the pin 246 is now rigidly affixed to the scapula 244 and aligned with the center of the glenoid cavity 242.

Figure 21:
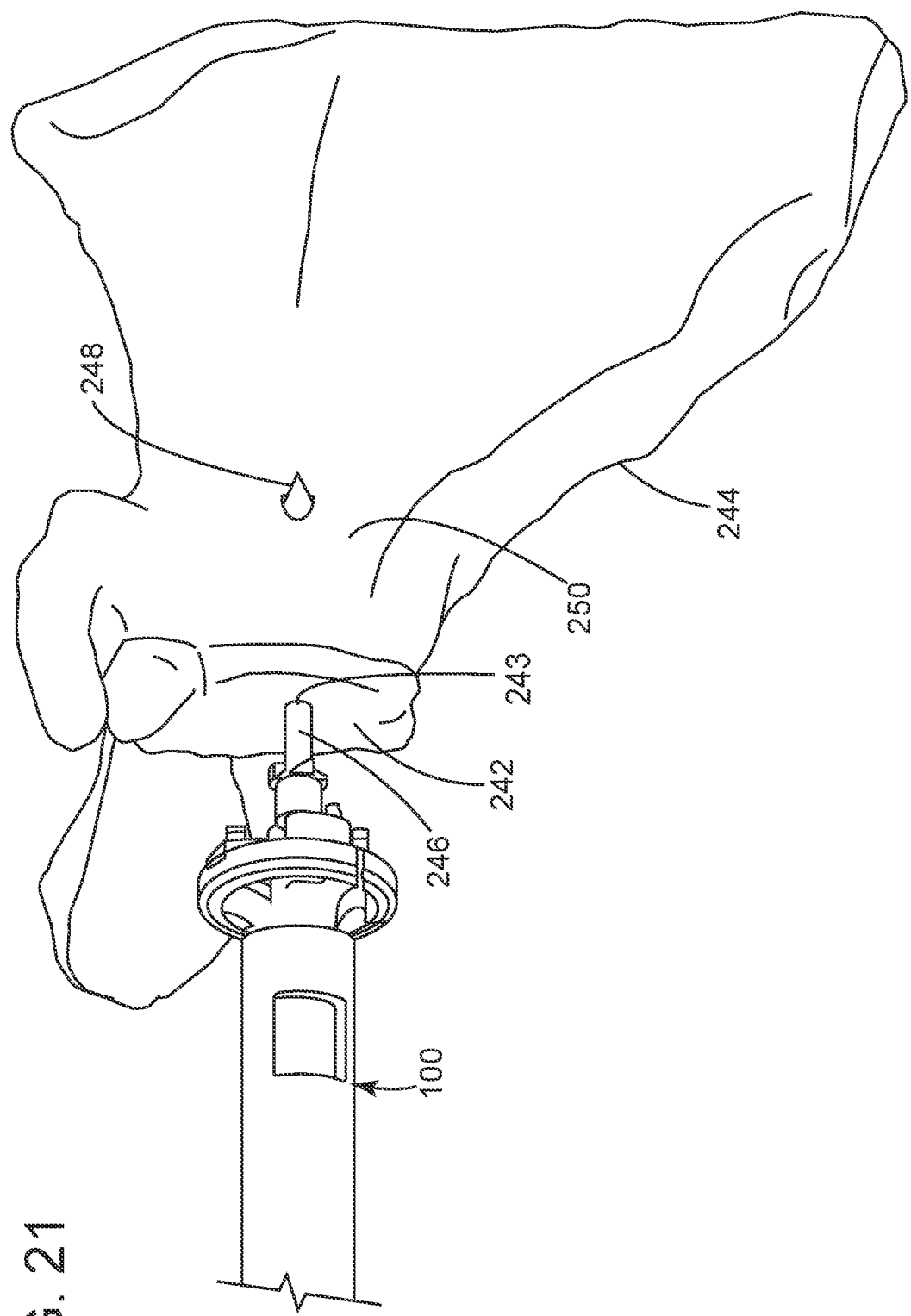
FIG. 21 depicts a perspective view of a bone reamer slid over the pin and in position to engage the glenoid cavity, in accordance with the present invention.

Referring to FIG. 21, a perspective view of the bone reamer 100 being slid over the pin 246 and in position to engage the glenoid cavity 242, in accordance with the present invention, is depicted. Next, the handle 232 and sizer 230 are slid off of the pin 246. The reamer 100 is then slid over the pin 246 (ref. 310 in FIG. 15) in order to align the reamer with the center 243 of the glenoid cavity 242.

Figure 22:
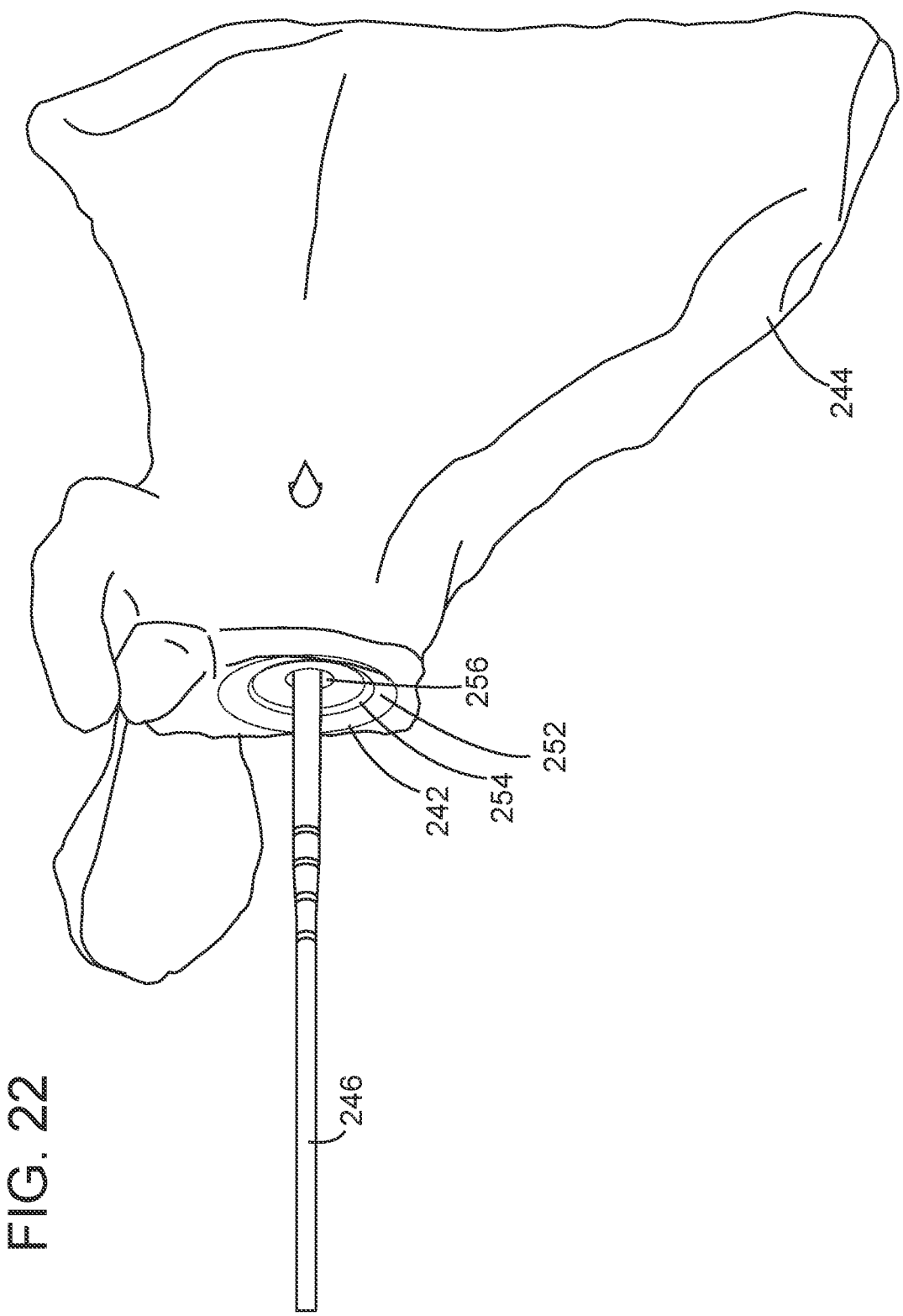
FIG. 22 depicts a perspective view of the glenoid cavity having a smooth circular surface, a circular groove and a center bore hole concentrically machined into the glenoid cavity by the bone reamer, in accordance with the present invention.

Referring to FIG. 22, a perspective view of the glenoid cavity 242 having a smooth circular surface 252, a circular groove 254 and a center bore hole 256 concentrically machined into the glenoid cavity by the bone reamer 100, in accordance with the present invention, is depicted. The reamer 100 simultaneously cuts the smooth circular surface 252, drills the circular groove 254 and drills the center bore hole 256 (ref 312 in FIG. 15). The reamer 100 is then slid off of the pin 246 to expose the prepared glenoid cavity 242.

Figure 23:
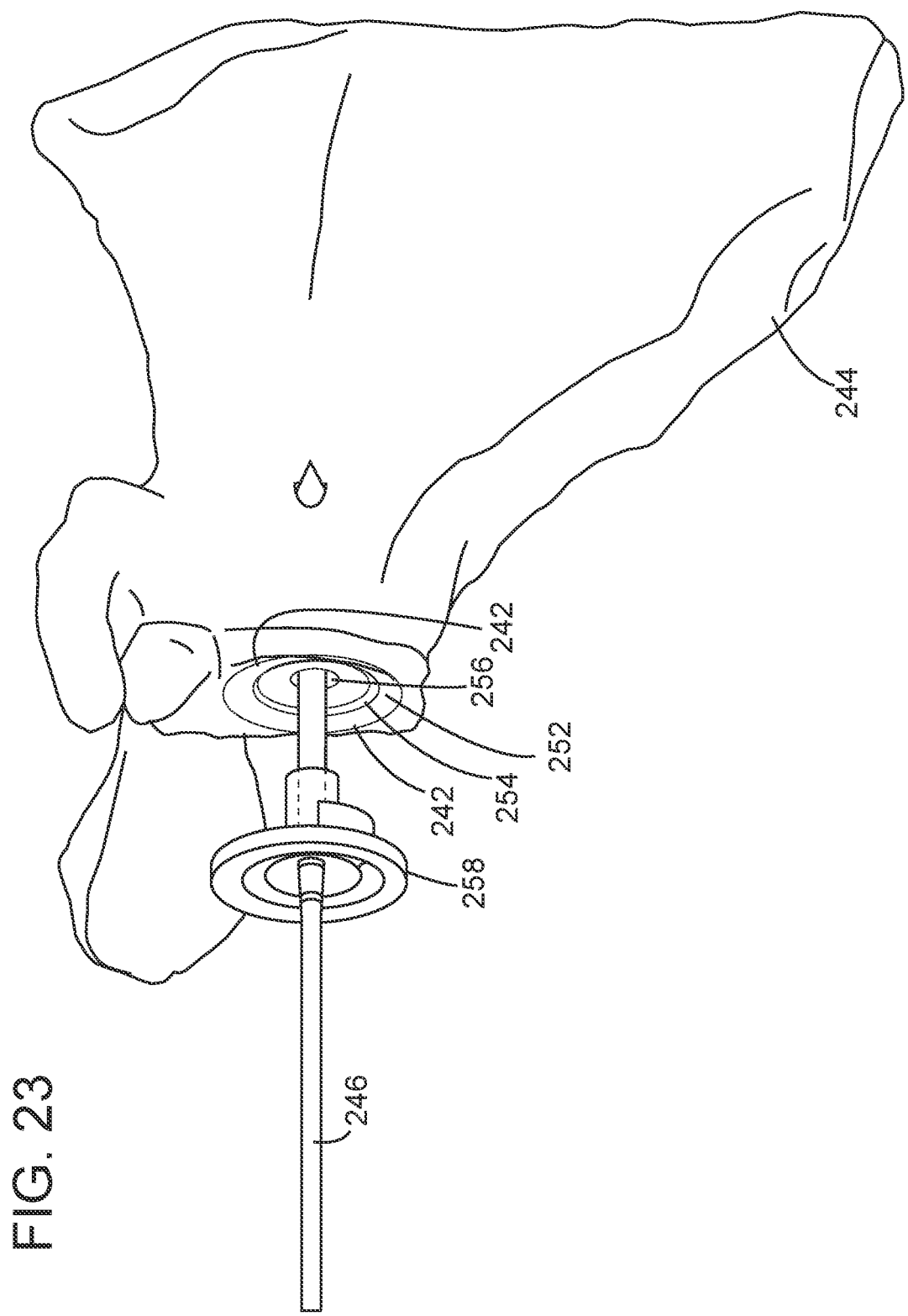
FIG. 23 depicts a perspective view of a trial implant being positioned over the pin for insertion into the glenoid cavity, in accordance with the present invention.

Referring to FIG. 23, a perspective view of a trial implant 258 being positioned on the pin 246 for insertion into the glenoid cavity 242, in accordance with the present invention, is depicted. The trial implant 258 is configured to have the same geometric structure and fit as the actual implant 200. However, the trial implant 258 does not lock into the circular groove 254 and center bore hole 256 as the implant 200 does. Therefore, the trial implant 258 can be slid along the pin 246 and inserted into the groove 254 and bore hole 256 (ref 314 in FIG. 15) to test the fit and sizing of the actual implant 200 with the humeral head implant (not shown) that it will be mating with. By utilizing the pin 246, the trial 258 can be precisely and easily aligned with the circular groove 254 and center bore hole 256.

Figure 24:
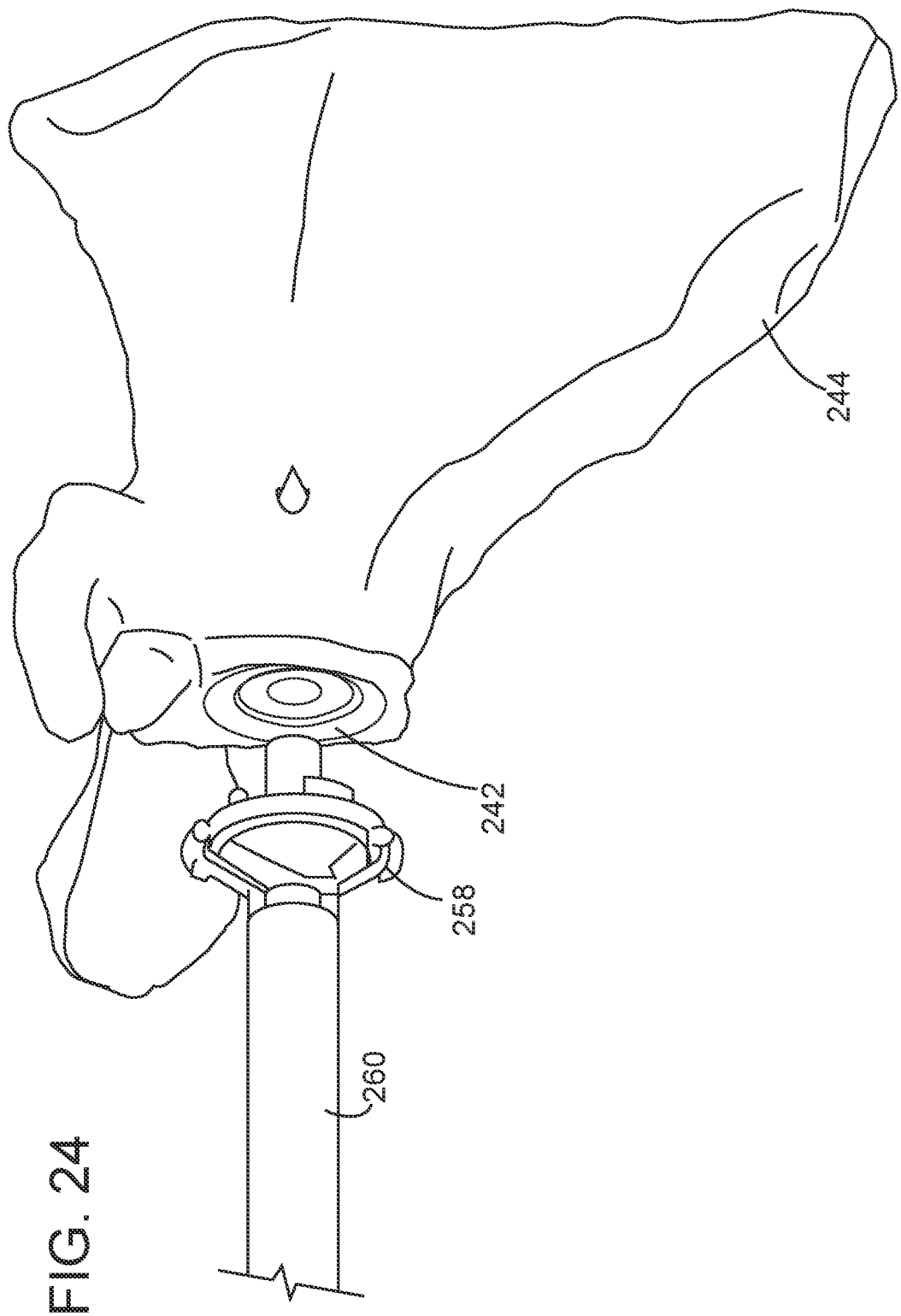
FIG. 24 depicts a perspective view of an insertion tool being utilized for insertion of the trial implant into the prepared glenoid bone, in accordance with the present invention.

Referring to FIG. 24, a perspective view of an insertion tool 260 being utilized for insertion of the trial implant into the glenoid cavity, in accordance with the present invention, is depicted. Alternatively to the positioning of the trial implant 258 with a pin 246 as illustrated in FIG. 23, the trial may be positioned for insertion with an insertion tool 260. In this alternative method, the pin 246 must be extracted from the scapula 244 prior to using the insertion tool 260.

Figure 25:
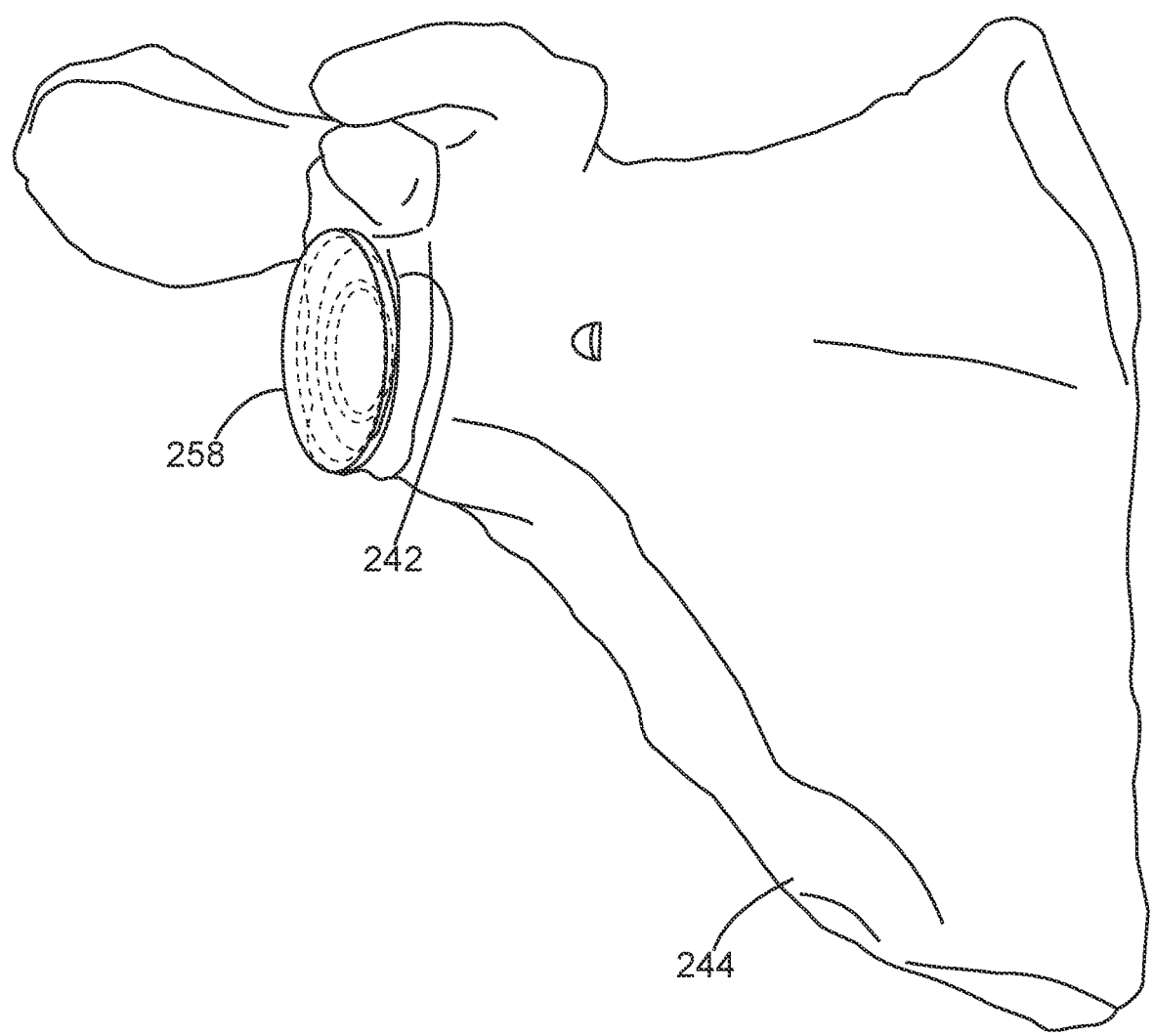
FIG. 25 depicts a perspective view of the trial implant fully inserted into the prepared glenoid bone, in accordance with the present invention.

Referring to FIG. 25, a perspective view of the trial implant 258 fully inserted into the glenoid cavity, in accordance with the present invention, is depicted. Once the trial implant 258 is inserted into the glenoid cavity, the pin 246 can be removed from the scapula 244. The trial implant 258 can then be utilized to test the fit of the glenoid implant 200 with the humeral head (not shown) that it will be mating with.

Figure 26:
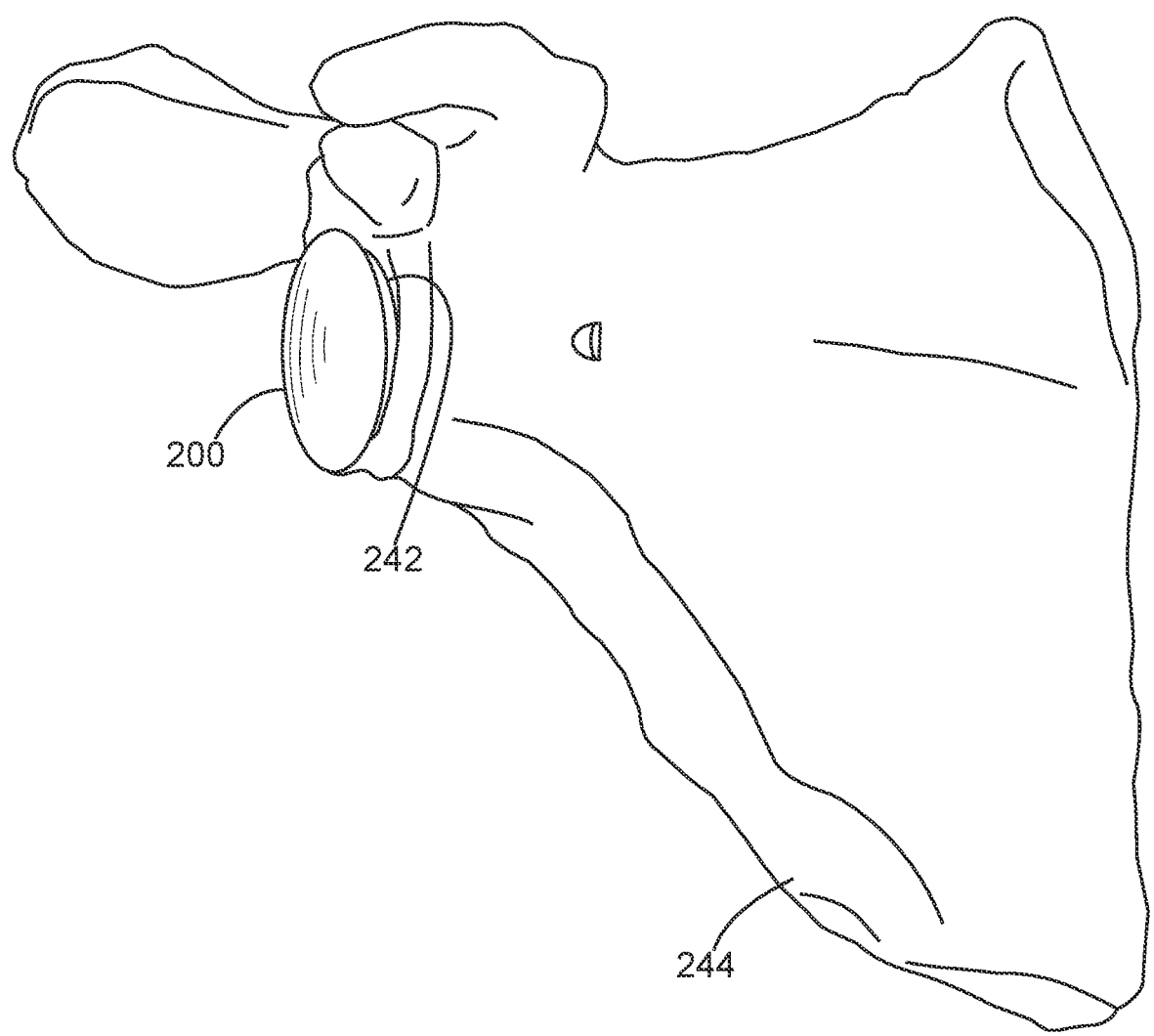
FIG. 26 depicts a lateral view of the implant fully inserted into the glenoid cavity, in accordance with the present invention.
Figure 27:
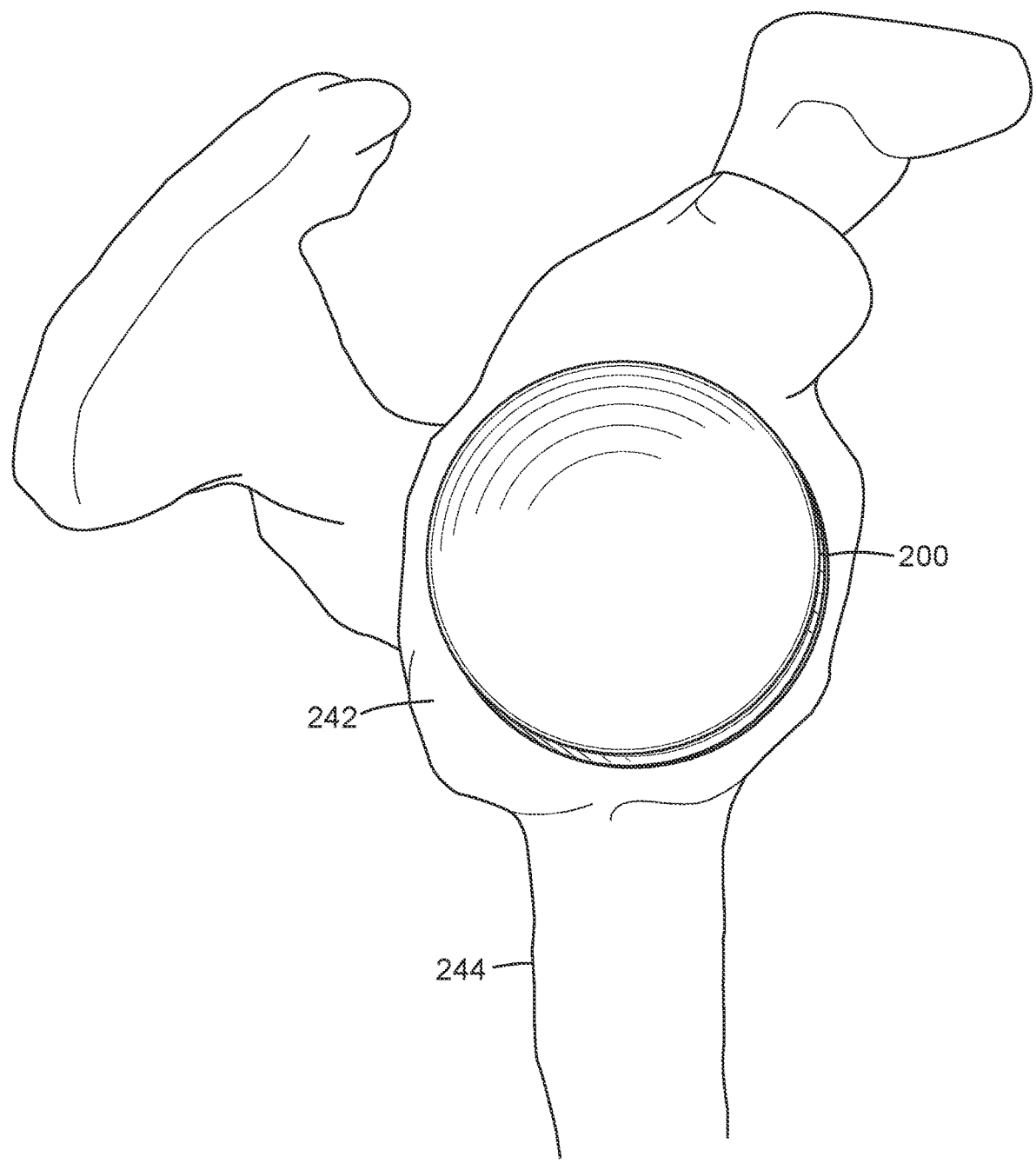
FIG. 27 depicts a lateral view of the glenoid implant fully inserted into the glenoid bone, in accordance with the present invention.

Referring to FIGS. 26 and 27, a front view (FIG. 26) and a lateral view (FIG. 27) of the glenoid implant 200 fully inserted into the glenoid cavity 242, in accordance with the present invention, is depicted. Once the fit of the glenoid implant 200 is verified by the trial implant 258, the trial implant can be removed and the actual glenoid implant 200 can be inserted into the glenoid cavity 242. The glenoid implant 200 may be inserted using the same insertion tool 260 used to insert the trial implant 258 (ref 316 in FIG. 15).

Advantageously, by utilizing the reamer 100 to simultaneously machine the smooth circular surface 252, the circular groove 254 and the center bore hole 256, the glenoid implant 200 is precisely aligned with the center 243 of the glenoid cavity 242. The alignment may be more accurate than when the bone preparing steps are done separately.

A disposable surgical kit for implanting an orthopedic implant into a bone may be assembled from the tools and devices illustrated herein. For example, the kit may include a bone reamer 100, a pin 246 and a glenoid implant 200. The bone reamer 100 of the kit is configured to simultaneously machine a smoothed circular surface 252 and a center bore hole 256 in a bone. The bone reamer 100 includes a shaft 102 having a first 106 and a second 108 end. The second end 108 is configured to connect to a power source. A head 104 of the bone reamer 100 includes a rear face 112 connected to the first end 106 of the shaft 102, a cutting face 114 on an opposing side of the head relative to the rear face, and a perimeter portion 116 having an inner perimeter 118 diameter and an outer perimeter diameter 120. The outer perimeter diameter 120 defines outer boundaries of the rear face and the cutting face. A blade member 122 of the reamer is disposed upon the cutting face and extends at least across the inner perimeter diameter of the perimeter portion. The blade member includes a first blade portion 124 having a first cutting edge 130 and a second blade portion 126 having a second cutting edge 132. The first and second cutting edges are disposed on opposing sides of the blade member. A center drill bit 136 of the reamer is disposed on the cutting face between the first and second cutting edges of the blade member. The center drill bit and the blade member are concentric with a center axis 128 of the reamer.

The pin 246 of the kit is for proper placement of the bone reamer on the bone. The implant 200 of the kit is for insertion onto the smoothed circular surface 252 and into the center bore hole 256 of the bone.

The surgical kit may also include an insertion tool 260 for use with inserting the implant 200 into the center bore hole 256 of the bone. The surgical kit may also include a sizer 230 and a handle 232 for use with placing the pin 246 within the bone. The surgical kit may also include a trial implant 258 for testing the fit of the glenoid implant 200 within the smoothed circular surface 252 and the center bore hole 256 of the bone.

The surgical kit may also include a bone reamer that is configured to simultaneously machine a smoothed circular surface 252, a center bore hole 256 and a circular groove 254 in a bone. In that case the bone reamer 100 would also include at least two cutting pegs 138 disposed symmetrically around an inner circumference 140 of the cutting face 114. The inner circumference 140 is concentric with the center axis 128 and has a smaller diameter than the outer perimeter diameter 120 of the perimeter portion 116.

As may be recognized by those of ordinary skill in the art based on the teachings herein, numerous changes and modifications may be made to the above-described and other embodiments of the present disclosure without departing from the scope of the disclosure. The components of the reamers, implants, devices, and/or systems as disclosed in the specification, including the accompanying abstract and drawings, may be replaced by alternative component(s) or feature(s), such as those disclosed in another embodiment, which serve the same, equivalent or similar purpose as known by those skilled in the art to achieve the same, equivalent or similar results by such alternative component(s) or feature(s) to provide a similar function for the intended purpose. In addition, the reamers, implants, devices, and/or systems may include more or fewer components or features than the embodiments as described and illustrated herein. For example, the components and features of reamer 100 may be used interchangeably and in alternative combinations as would be modified or altered by one of skill in the art. Further, the steps of the surgical methods associated with the reamer 100 may be used interchangeably and in alternative combinations as would be modified or altered by one of skill in the art. Accordingly, this detailed description of the currently preferred embodiments is to be taken in an illustrative, as opposed to limiting of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has", and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The invention has been described with reference to the preferred embodiments. It will be understood that the operational embodiments described herein are exemplary of a plurality of possible arrangements to provide the same general features, characteristics, and general system operation. Modifications and alterations will occur to others upon a reading and understanding of the preceding detailed description. It is intended that the invention be construed as including all such modifications and alterations.

Having thus described the preferred embodiments, the invention is now claimed to be:

1. A bone reamer comprising:
   a shaft having a first and a second end, the second end configured to connect to a power source;
   a head comprising: (i) a rear face connected to the first end of the shaft, (ii) a cutting face on an opposing side of the head relative to the rear face, and (iii) a perimeter portion having an inner perimeter diameter and an outer perimeter diameter, the outer perimeter diameter defining outer boundaries of the rear face and the cutting face;
   a single blade member disposed upon the cutting face and extending at least across the inner perimeter diameter of the perimeter portion, the blade member being configured to alone cut a smooth circular surface into a portion of a bone during rotation of the bone reamer and comprising: (i) a first blade portion having a first cutting edge, and (ii) a second blade portion having a second cutting edge, the first and second cutting edges being disposed on opposing sides of the blade member;
   a center drill bit disposed on the cutting face between the first and second blade portions of the blade member, the center drill bit being configured to drill a center bore hole into the portion of the bone during rotation of the bone reamer, the center drill bit and the blade member being concentric with a center axis of the reamer; and
   a plurality of cutting pegs disposed symmetrically around an inner circumference of the cutting face at a radial location between the first blade portion and the second blade portion such that all of the cutting pegs on the cutting face are spaced apart from the first blade portion and the second blade portion, the inner circumference being concentric with the center axis and having a smaller diameter than the outer perimeter diameter of the perimeter portion, the cutting pegs being configured to form a circular groove into the smooth circular surface of the portion of the bone formed by the blade member during rotation of the bone reamer.

2. The bone reamer of claim 1, wherein each of the at least two cutting pegs comprise:
a peg body having an upper end portion extending away from the cutting face of the head; and
a peg cutting blade disposed on the upper end portion, the peg cutting blade operable to cut through bone as the bone reamer is rotated.

3. The bone reamer of claim 1, wherein the at least two cutting pegs comprise at least 6 pegs.

4. The bone reamer of claim 1, wherein the perimeter portion includes a first removable member, the first removable member comprising:
a first end having a breakable connection to an adjacent first section of the perimeter portion, the first end configured to break off of the first section when a predetermined torque is applied to the first removable member; and
a second end that is spaced apart from an adjacent second section of the perimeter portion, the second section of the perimeter portion having rounded surfaces disposed between the rear face and the cutting face of the head.

5. The bone reamer of claim 4, wherein the perimeter portion includes a second removable member, the second removable member comprising:
a third end having a breakable connection to an adjacent third section of the perimeter portion, the third end configured to break off of the third section when a predetermined torque is applied to the second removable member; and
a fourth end that is spaced apart from an adjacent fourth section of the perimeter portion, the fourth section of the perimeter portion having rounded surfaces disposed between the rear face and the cutting face of the head.

6. The bone reamer of claim 5, wherein the first and second removable members each form a circular arc spanning an angular range of between 30 to 45 degrees.

7. A bone reamer comprising:
a shaft having a first and a second end, the second end configured to connect to a power source;
a head comprising:
a rear face connected to the first end of the shaft,
a cutting face on an opposing side of the head relative to the rear face, and
a perimeter portion having an inner perimeter diameter and an outer perimeter diameter, the outer perimeter diameter defining outer boundaries of the rear face and the cutting face, wherein the perimeter portion also includes a first removable member, the first removable member comprising:
a first end having a breakable connection to an adjacent first section of the perimeter portion, the first end configured to break off of the first section when a predetermined torque is applied to the first removable member, and
a second end that is spaced apart from an adjacent second section of the perimeter portion, the second section of the perimeter portion having rounded surfaces disposed between the rear face and the cutting face of the head; and
a blade member disposed upon the cutting face and extending at least across the inner perimeter diameter of the perimeter portion, the blade member comprising:
a first blade portion having a first cutting edge, and
a second blade portion having a second cutting edge, the first and second cutting edges being disposed on opposing sides of the blade member.

8. The bone reamer of claim 7, wherein the perimeter portion includes a second removable member, the second removable member comprising:
a third end having a breakable connection to an adjacent third section of the perimeter portion, the third end configured to break off of the third section when a predetermined torque is applied to the second removable member; and
a fourth end that is spaced apart from an adjacent fourth section of the perimeter portion, the fourth section of the perimeter portion having rounded surfaces disposed between the rear face and the cutting face of the head.

9. The bone reamer of claim 8, wherein the first and second removable members each form a circular arc spanning an angular range of between 30 to 45 degrees.

10. The bone reamer of claim 8, comprising:
a center drill bit disposed on the cutting face between the first and second cutting edges of the blade member, the center drill bit and the blade member being concentric with a center axis of the reamer.

11. The bone reamer of claim 8 comprising:
at least two cutting pegs disposed symmetrically around an inner circumference of the cutting face, the inner circumference being concentric about the center axis and having a smaller diameter than the outer perimeter diameter of the perimeter portion.

12. A surgical kit comprising:
a disposable bone reamer configured to simultaneously machine a circular surface, a circular groove, and a center bore hole in a bone, the bone reamer comprising:
(i) a shaft having a first and a second end, the second end configured to connect to a power source,
(ii) a head comprising: (a) a rear face connected to the first end of the shaft, (b) a cutting face on an opposing side of the head relative to the rear face, and (c) a perimeter portion having an inner perimeter diameter and an outer perimeter diameter, the outer perimeter diameter defining outer boundaries of the rear face and the cutting face, and (iii) a single blade member disposed upon the cutting face and extending at least across the inner perimeter diameter of the perimeter portion, the blade member being configured to alone cut the circular surface into the bone during rotation of the bone reamer and comprising: (a) a first blade portion having a first cutting edge, and (b) a second blade portion having a second cutting edge, the first and second cutting edges being disposed on opposing sides of the blade member,
(iii) a center drill bit disposed on the cutting face between the first and second cutting edges of the blade member, the center drill bit being configured to drill the center bore hole into the bone during rotation of the bone reamer, the center drill bit and the blade member being concentric with a center axis of the reamer, and
(iv) a plurality of cutting pegs disposed symmetrically around an inner circumference of the cutting face at a radial location between the first blade portion and the second blade portion such that all of the cutting pegs on the cutting face are spaced apart from the first blade portion and the second blade portion, the inner circumference being concentric with the center axis and having a smaller diameter than the outer perimeter diameter of the perimeter portion, the cutting pegs being configured to form the circular groove in the bone during rotation of the bone reamer;

a pin for placement of the bone reamer on the bone; and an implant for insertion onto the circular surface and into the circular groove and the center bore hole of the bone.

13. The surgical kit of claim 12, further comprising an insertion tool for use with inserting the implant into the center bore hole of the bone.

14. The surgical kit of claim 12, further comprising at least one sizer and a handle for use with placing the pin within the bone.

15. The surgical kit of claim 12, further comprising at least one trial for testing the size of the implant within the circular surface and the center bore hole of the bone.

\* \* \* \* \*